(12) United States Patent
Ferrari et al.

(10) Patent No.: US 7,912,823 B2
(45) Date of Patent: Mar. 22, 2011

(54) HIERARCHICAL DATA-DRIVEN NAVIGATION SYSTEM AND METHOD FOR INFORMATION RETRIEVAL

(75) Inventors: Adam J. Ferrari, Cambridge, MA (US); David Gourley, Cambridge, MA (US); Keith Johnson, Newton, MA (US); Frederick C. Knabe, Boston, MA (US); Daniel Tunkelang, Cambridge, MA (US); John S. Walter, Boston, MA (US)

(73) Assignee: Endeca Technologies, Inc., Cambridge, MA (US)

( * ) Notice: Subject to any disclaimer, the term of this patent is extended or adjusted under 35 U.S.C. 154(b) by 576 days.

(21) Appl. No.: 11/931,345

(22) Filed: Oct. 31, 2007

(65) Prior Publication Data

US 2008/0134100 A1 Jun. 5, 2008

Related U.S. Application Data

(62) Division of application No. 11/268,868, filed on Nov. 8, 2005, now abandoned, which is a division of application No. 09/573,305, filed on May 18, 2000, now Pat. No. 7,035,864.

(51) Int. Cl.
*G06F 17/30* (2006.01)
(52) U.S. Cl. ........ 707/705; 707/706; 707/758; 707/790; 707/962
(58) Field of Classification Search .................. 707/705, 707/706, 758, 790, 962
See application file for complete search history.

(56) References Cited

U.S. PATENT DOCUMENTS

| 4,775,935 A | 10/1988 | Yourick |
| 4,868,733 A | 9/1989 | Fujisawa et al. |
| 4,879,648 A | 11/1989 | Cochran et al. |

(Continued)

FOREIGN PATENT DOCUMENTS

EP 0196064 10/1986

(Continued)

OTHER PUBLICATIONS

Pollitt, A. S. et al., "View-based searching systems—a new paradigm for information retrieval based on faceted classification and indexing using mutually constraining knowledge-based views", The Interface Design, 6 pages.

(Continued)

Primary Examiner — Hung Q Pham
(74) Attorney, Agent, or Firm — Lando & Anastasi, LLP

(57) ABSTRACT

A data-driven, hierarchical information navigation system and method enable search of sets of documents or other materials by certain common attributes that characterize the materials. The invention includes several aspects of a data-driven, hierarchical navigation system that employs this navigation mode. The navigation system of the present invention includes features of an interface, a knowledge base and a taxonomy definition process and a classification process for generating the knowledge base, a graph-based navigable data structure and method for generating the data structure, World Wide Web-based applications of the system, and methods of implementing the system. Users are able to search or browse a particular collection of documents by selecting desired values for the attributes. A data-driven, hierarchical information navigation system and method enable this navigation mode by associating terms with the materials, defining a set of hierarchical relationships among the terms, and providing a guided search mechanism based on the relationship between the terms.

3 Claims, 15 Drawing Sheets

U.S. PATENT DOCUMENTS

| | | |
|---|---|---|
| 4,996,642 A | 2/1991 | Hey |
| 5,206,949 A | 4/1993 | Cochran et al. |
| 5,241,671 A | 8/1993 | Reed et al. |
| 5,418,717 A | 5/1995 | Su et al. |
| 5,418,948 A | 5/1995 | Turtle |
| 5,418,951 A | 5/1995 | Damashek |
| 5,440,742 A | 8/1995 | Schwanke |
| 5,485,621 A | 1/1996 | Schwanke |
| 5,544,049 A | 8/1996 | Henderson et al. |
| 5,546,576 A | 8/1996 | Cochrane et al. |
| 5,548,506 A | 8/1996 | Srinivasan |
| 5,590,269 A | 12/1996 | Kruse et al. |
| 5,600,829 A | 2/1997 | Tsatalos et al. |
| 5,630,125 A | 5/1997 | Zellweger |
| 5,634,128 A | 5/1997 | Messina |
| 5,644,740 A | 7/1997 | Kiuchi |
| 5,671,404 A | 9/1997 | Lizee et al. |
| 5,675,784 A | 10/1997 | Maxwell et al. |
| 5,696,916 A | 12/1997 | Yamazaki et al. |
| 5,706,497 A | 1/1998 | Takahashi et al. |
| 5,715,444 A | 2/1998 | Danish et al. |
| 5,724,571 A | 3/1998 | Woods |
| 5,740,425 A | 4/1998 | Povilus |
| 5,749,081 A | 5/1998 | Whiteis |
| 5,764,975 A | 6/1998 | Taniguchi et al. |
| 5,768,578 A | 6/1998 | Kirk et al. |
| 5,768,581 A | 6/1998 | Cochran |
| 5,787,422 A | 7/1998 | Tukey et al. |
| 5,812,998 A | 9/1998 | Tsutsumi et al. |
| 5,819,273 A | 10/1998 | Vora et al. |
| 5,835,905 A | 11/1998 | Pirolli et al. |
| 5,852,822 A | 12/1998 | Srinivasan et al. |
| 5,864,845 A | 1/1999 | Voorhees et al. |
| 5,864,846 A | 1/1999 | Voorhees et al. |
| 5,864,863 A | 1/1999 | Burrows |
| 5,870,746 A | 2/1999 | Knutson et al. |
| 5,873,075 A | 2/1999 | Cochrane et al. |
| 5,875,440 A | 2/1999 | Cooperman et al. |
| 5,875,446 A | 2/1999 | Brown et al. |
| 5,878,423 A | 3/1999 | Anderson et al. |
| 5,893,104 A | 4/1999 | Srinivasan et al. |
| 5,895,470 A | 4/1999 | Pirolli et al. |
| 5,897,639 A | 4/1999 | Greef et al. |
| 5,920,859 A | 7/1999 | Li |
| 5,924,105 A | 7/1999 | Punch, III et al. |
| 5,926,811 A | 7/1999 | Miller et al. |
| 5,940,821 A | 8/1999 | Wical |
| 5,943,670 A | 8/1999 | Prager |
| 5,950,189 A | 9/1999 | Cohen et al. |
| 5,970,489 A | 10/1999 | Jacobson et al. |
| 5,978,788 A | 11/1999 | Castelli et al. |
| 5,978,794 A | 11/1999 | Agrawal et al. |
| 5,978,799 A | 11/1999 | Hirsch |
| 5,983,219 A | 11/1999 | Danish et al. |
| 5,983,220 A | 11/1999 | Schmitt |
| 5,983,223 A | 11/1999 | Perlman |
| 5,986,655 A | 11/1999 | Chiu et al. |
| 5,987,468 A | 11/1999 | Singh et al. |
| 5,987,470 A | 11/1999 | Meyers et al. |
| 5,991,751 A | 11/1999 | Rivette et al. |
| 5,991,756 A | 11/1999 | Wu |
| 6,006,217 A | 12/1999 | Lumsden |
| 6,006,218 A | 12/1999 | Breese et al. |
| 6,006,222 A | 12/1999 | Culliss |
| 6,006,225 A | 12/1999 | Bowman et al. |
| 6,009,424 A | 12/1999 | Lepage et al. |
| 6,012,006 A | 1/2000 | Ohneda et al. |
| 6,012,066 A | 1/2000 | Discount et al. |
| 6,014,639 A | 1/2000 | Fohn et al. |
| 6,014,655 A | 1/2000 | Fujiwara et al. |
| 6,014,657 A | 1/2000 | Weida et al. |
| 6,014,665 A | 1/2000 | Culliss |
| 6,028,605 A | 2/2000 | Conrad et al. |
| 6,029,195 A | 2/2000 | Herz |
| 6,035,294 A | 3/2000 | Fish |
| 6,038,560 A | 3/2000 | Wical |
| 6,038,574 A | 3/2000 | Pitkow et al. |
| 6,049,797 A | 4/2000 | Guha et al. |
| 6,070,162 A | 5/2000 | Miyasaka et al. |
| 6,092,049 A | 7/2000 | Chislenko et al. |
| 6,094,650 A | 7/2000 | Stoffel et al. |
| 6,112,186 A | 8/2000 | Bergh et al. |
| 6,144,958 A | 11/2000 | Ortega et al. |
| 6,167,368 A | 12/2000 | Wacholder |
| 6,167,397 A | 12/2000 | Jacobson et al. |
| 6,212,517 B1 | 4/2001 | Sato et al. |
| 6,226,745 B1 | 5/2001 | Wiederhold |
| 6,236,985 B1 | 5/2001 | Aggarwal et al. |
| 6,236,987 B1 | 5/2001 | Horowitz et al. |
| 6,240,378 B1 | 5/2001 | Imanaka et al. |
| 6,240,409 B1 | 5/2001 | Aiken |
| 6,243,713 B1 | 6/2001 | Nelson et al. |
| 6,260,008 B1 | 7/2001 | Sanfilippo |
| 6,263,334 B1 | 7/2001 | Fayyad et al. |
| 6,266,199 B1 | 7/2001 | Gillis et al. |
| 6,266,649 B1 | 7/2001 | Linden et al. |
| 6,269,368 B1 | 7/2001 | Diamond |
| 6,272,507 B1 | 8/2001 | Pirolli et al. |
| 6,289,354 B1 | 9/2001 | Aggarwal et al. |
| 6,301,577 B1 | 10/2001 | Matsumoto et al. |
| 6,317,741 B1 | 11/2001 | Burrows |
| 6,339,767 B1 | 1/2002 | Rivette et al. |
| 6,345,273 B1 | 2/2002 | Cochran |
| 6,356,899 B1 | 3/2002 | Chakrabarti et al. |
| 6,360,227 B1 | 3/2002 | Aggarwal et al. |
| 6,360,277 B1 | 3/2002 | Ruckley et al. |
| 6,363,377 B1 | 3/2002 | Kravets et al. |
| 6,385,602 B1 | 5/2002 | Tso et al. |
| 6,397,221 B1 | 5/2002 | Greef et al. |
| 6,418,429 B1 | 7/2002 | Borovoy et al. |
| 6,424,971 B1 | 7/2002 | Kreulen et al. |
| 6,424,983 B1 | 7/2002 | Schabes et al. |
| 6,429,984 B1 | 8/2002 | Alex |
| 6,446,068 B1 | 9/2002 | Kortge |
| 6,453,315 B1 | 9/2002 | Weissman et al. |
| 6,460,034 B1 | 10/2002 | Wical |
| 6,466,918 B1 | 10/2002 | Spiegel et al. |
| 6,480,843 B2 | 11/2002 | Li |
| 6,483,523 B1 | 11/2002 | Feng |
| 6,490,111 B1 | 12/2002 | Sacks |
| 6,505,197 B1 | 1/2003 | Sundaresan et al. |
| 6,519,618 B1 | 2/2003 | Snyder |
| 6,539,376 B1 | 3/2003 | Sundaresan et al. |
| 6,553,367 B2 | 4/2003 | Horovitz et al. |
| 6,560,597 B1 | 5/2003 | Dhillon et al. |
| 6,563,521 B1 | 5/2003 | Perttunen |
| 6,571,282 B1 | 5/2003 | Bowman-Amuah |
| 6,606,619 B2 | 8/2003 | Ortega et al. |
| 6,611,825 B1 | 8/2003 | Billheimer et al. |
| 6,618,697 B1 | 9/2003 | Kantrowitz et al. |
| 6,628,466 B2 | 9/2003 | Alex |
| 6,633,316 B1 | 10/2003 | Maddalozzo, Jr. et al. |
| 6,633,860 B1 | 10/2003 | Afek et al. |
| 6,633,868 B1 | 10/2003 | Min et al. |
| 6,647,391 B1 | 11/2003 | Smith et al. |
| 6,651,058 B1 | 11/2003 | Sundaresan et al. |
| 6,697,801 B1 | 2/2004 | Eldredge et al. |
| 6,697,998 B1 | 2/2004 | Damerau et al. |
| 6,711,585 B1 | 3/2004 | Copperman et al. |
| 6,735,578 B2 | 5/2004 | Shetty et al. |
| 6,748,371 B1 | 6/2004 | Levanoni et al. |
| 6,763,349 B1 | 7/2004 | Sacco |
| 6,763,351 B1 | 7/2004 | Subramaniam et al. |
| 6,778,995 B1 | 8/2004 | Gallivan |
| 6,845,354 B1 | 1/2005 | Kuo et al. |
| 6,853,982 B2 | 2/2005 | Smith et al. |
| 6,868,411 B2 | 3/2005 | Shanahan |
| 6,928,434 B1 | 8/2005 | Choi et al. |
| 6,947,930 B2 | 9/2005 | Anick et al. |
| 6,978,274 B1 | 12/2005 | Gallivan et al. |
| 7,035,864 B1 | 4/2006 | Ferrari et al. |
| 7,062,483 B2 | 6/2006 | Ferrari et al. |
| 7,072,902 B2 | 7/2006 | Kleinberger et al. |
| 7,085,771 B2 | 8/2006 | Chung et al. |
| 7,092,936 B1 | 8/2006 | Alonso et al. |
| 7,093,200 B2 | 8/2006 | Schreiber et al. |
| 7,099,885 B2 | 8/2006 | Hellman et al. |

| | | | |
|---|---|---|---|
| 7,149,732 | B2 | 12/2006 | Wen et al. |
| 7,325,201 | B2 | 1/2008 | Ferrari et al. |
| 7,366,721 | B1 | 4/2008 | Bennett et al. |
| 7,389,241 | B1 | 6/2008 | Bascom |
| 7,428,528 | B1 | 9/2008 | Ferrari et al. |
| 7,856,434 | B2 | 12/2010 | Gluzman Peregrine |
| 2001/0044758 | A1 | 11/2001 | Talib et al. |
| 2001/0044837 | A1 | 11/2001 | Talib et al. |
| 2001/0047353 | A1 | 11/2001 | Talib et al. |
| 2001/0049674 | A1 | 12/2001 | Talib et al. |
| 2001/0049677 | A1 | 12/2001 | Talib et al. |
| 2002/0051020 | A1 | 5/2002 | Ferrari et al. |
| 2002/0065857 | A1 | 5/2002 | Michalewicz et al. |
| 2002/0083039 | A1 | 6/2002 | Ferrari et al. |
| 2002/0091696 | A1 | 7/2002 | Craft et al. |
| 2002/0095405 | A1 | 7/2002 | Fujiwara |
| 2002/0099675 | A1 | 7/2002 | Agrafiotis et al. |
| 2002/0147703 | A1 | 10/2002 | Yu et al. |
| 2002/0152204 | A1 | 10/2002 | Ortega et al. |
| 2003/0101187 | A1 | 5/2003 | Gaussier et al. |
| 2003/0110181 | A1 | 6/2003 | Schuetze et al. |
| 2003/0120630 | A1 | 6/2003 | Tunkelang |
| 2003/0217335 | A1 | 11/2003 | Chung et al. |
| 2004/0117366 | A1 | 6/2004 | Ferrari et al. |
| 2004/0205448 | A1 | 10/2004 | Grefenstette et al. |
| 2004/0243554 | A1 | 12/2004 | Broder et al. |
| 2004/0243557 | A1 | 12/2004 | Broder et al. |
| 2005/0022114 | A1 | 1/2005 | Shanahan et al. |
| 2005/0097088 | A1 | 5/2005 | Bennett et al. |
| 2005/0108212 | A1 | 5/2005 | Karimisetty et al. |
| 2005/0165780 | A1 | 7/2005 | Omega et al. |
| 2005/0210042 | A1 | 9/2005 | Goedken |
| 2006/0031215 | A1 | 2/2006 | Pong Robert |
| 2006/0224581 | A1 | 10/2006 | Sasai |
| 2007/0106658 | A1 | 5/2007 | Ferrari et al. |
| 2008/0104032 | A1 | 5/2008 | Sarkar |
| 2008/0133479 | A1 | 6/2008 | Zelevinsky |

FOREIGN PATENT DOCUMENTS

| | | | |
|---|---|---|---|
| EP | 0597630 | | 5/1994 |
| EP | 0676705 | | 10/1995 |
| EP | 0694829 | A1 | 1/1996 |
| EP | 0795833 | | 9/1997 |
| EP | 0827063 | | 3/1998 |
| EP | 0918295 | | 5/1999 |
| EP | 1050830 | | 11/2000 |
| EP | 0 694 829 | B1 | 5/2002 |
| EP | 0694829 | | 5/2002 |
| GB | 2293667 | | 4/1996 |
| GB | 2297179 | | 7/1996 |
| JP | 09034901 | | 2/1997 |
| JP | 10134063 | | 5/1998 |
| JP | 11250107 | | 9/1999 |
| JP | 11296547 | | 10/1999 |
| WO | 90/04231 | | 4/1990 |
| WO | 96/27161 | | 9/1996 |
| WO | 97/36251 | | 10/1997 |
| WO | 98/20436 | | 5/1998 |
| WO | 00/36529 | | 6/2000 |
| WO | 01/67225 | | 9/2001 |
| WO | 01/67300 | | 9/2001 |
| WO | 02/097671 | A2 | 12/2002 |
| WO | 03/027902 | | 4/2003 |

OTHER PUBLICATIONS

Pollitt, A.S., "A rule-based system as an intermediary for searching cancer therapy literature on Medline", Intelligent Information Systems: Progress and Prospects, pp. 82-126, 1986.

Pollitt, A.S., "An Expert Systems Approach to Document Retrieval, A thesis submitted to the Council for National Academic Awards in partial fulfillment of the requirements for the degree Doctor of Philosophy", May 1986.

Pollitt, A.S., "Expert Systems and the Information Intermediary: Tackling Some of the Problems of Naive End-User Search Specification and Formulation", Intelligent Information Systems for the Information Society, pp. 100-108, 1986.

Pollitt, A.S., Information Storage and Retrieval Systems, Origin, Development and Applications, Ellis Horwood Books in Information Technology, 1989.

Pollitt, A.S., "Reducing complexity by rejecting the consultation model as a basis for the design of expert systems", Expert Systems, vol. 3, No. 4, pp. 234-238, Oct. 1986.

Pollitt, A.S., "Taking a different view", British Library research, Library Technology, vol. 1, Nov. 1, 1996.

Pollitt, A.S., "The key role of classification and indexing in view-based searching", Centre for Database Access Research, University of Huddersfield, UK, Abstract, 8 pages.

Pollitt, et al. "Hibrowse for Bibliographic Databases" Journal of Information Science, (1994), vol. 20 (6), pp. 413-426.

Pollitt, et al. "View-Based Searching Systems—Progress Towards Effective Disintermediation" Online Information Meeting Proceedings, (1996) pp. 433-445.

Pollitt, Example from EMBASE entitled "Screen Shots from View-based searching with Hibrowse", (1998).

Pollitt, excerpt from "Prospects for using Dewey Classification in a View-based Searching OPAC Dewey Decimel Classification: Possibilities in View-based Searching OPAC", (1998).

Pollitt, S., "CanSearch: An Expert Systems Approach to Document Retrieval", Information Processing & Management, vol. 23, No. 2, pp. 119-138, (1987).

PriceSCAN.com, Your Unbiased Guide to the Lowest Price on Books, Computers, Electronic,Copyright 1997-1999, <http://web.archive.org/web/19991117123352/http://www.pricescan.com/>, pp. 1-8.

Priss, U. et al., "Utilizing Faceted Structures for Information Systems Design", School of Library and Information Science, Indiana University Bloomington, pp. 1-12.

Ramaswami et al., "Navigating a Protection-Engineering Data Base", IEEE, pp. 27-32, Apr. 1989.

Salton et al., "Term-weighting approaches in automatic test retrieval", Information Processing & Management, (1988), vol. 24(5), pp. 513-523.

Screenshots from "View-based searching with Hibrowse", http://www.jbi.hio.no/bibin/kurs/korg98/oslo2.ppt, 10 pages.

Shamos et al., "Closest-point problems", Proceedings of the 16th Annual Symposium on Foundations of Computer Science, IEEE (1975).

Story, G.A., et al., "The RightPages Image-Based Electronic Library for Alerting and Browsing" Computer, (1992), vol. 25(9), pp. 17-25.

Treglown, M. et al., "Hibrowse for Bibliographic Databases: A study of the application of usability techniques in view-based searching", British Library Research and Innovation Report 52, The University of Huddersfield, Apr. 1997.

Tu et al., "Agent Technology for Website Browsing and Navigation, Proceedings of the 32nd Hawaii International Conference on Systems Sciences", IEEE , pp. 1-10, 1999.

Turine et al., "A Navigation-Oriented Hypertext Model Based on Statecharts", Hypertext 97, Southampton UK, 1997.

Velez et al., "Fast and Effective Query Refinement", SIGIR 1997, pp. 6-15.

Weiland et al., "A graphical query interface based on aggregation/generalization hierarchies," Information systems, vol. 18, No. 4, pp. 215-232 (1993).

Xiong et al., "Taper: A Two-Step Approach for All-Strong-Pairs Correlation Query in Large Databases", IEEE Transactions on Knowledge and Data Engineering, vol. 18, No. 4, Apr. 2006, pp. 493-508.

Yahoo 1996 (Exhibit 12-16).

Yahoo!, Copyright 1999 Yahoo! Inc., <http://web.archive.org/web/19991116151216/http://www4.yahoo.com/>.

Yoo et al., "Towards A Relationship Navigation Analysis, Proceedings of the 32nd Hawaii International Conference on System Sciences", IEEE, pp. 1-10, (2000).

European Search Authority, European Search Report for European Application No. 02773183.5 mailed Oct. 15, 2007.

Final Office action mailed on Jan. 7, 2009 for U.S. Appl. No. 11/268,868, filed Nov. 8, 2005.

George Koch and Kevin Loney, "Oracle 8, the Complete Reference," Osborne McGrawHill, p. 68 (1997).

International Search Report and Written Opinion for International Patent Application No. PCt/US07/86150, mailed Jul. 23, 2008.
International Searching Authority, International Search Report for PCT/03/31770, mailed Jun. 29, 2004.
Non Final Office action mailed Feb. 21, 2008 for U.S. Appl. No. 09/961,131, filed Sep. 21, 2001.
Non Final Office Action mailed Jul. 23, 2008 for U.S. Appl. No. 11/271,036, filed Nov. 10, 2005.
Non final Office Action mailed on Jul. 23, 2008 for U.S. Appl. No. 11/408,797, filed Apr. 20, 2006.
Agosti, M., et al. "Issues of Data Modelling in Information Retrieval" Electronic Publishing, (1991), vol. 4(4) pp. 219-237.
Allen, R.B., "Retrieval From Facet Spaces" Electronic Publishing (1995), vol. 8(2&3), pp. 247-257.
Allen, R.B., "Two Digital Library Interfaces That Exploit Hierarchical Structure" Electronic Publishing (1995) 8 pages.
Amato, et al., "Region proximity in metric spaces and its use for approximate similarity search", ACM Trans. In. System, (2003), vol. 21(2), pp. 192-227.
Baeza-Yates, et al., "New Approaches to Information Management: Attribute-Centric Data Systems" Proceedings Seventh International Symposium on String Processing and Information Retrieval, (2000), pp. 17-27.
Beaudoin et al., "Cheops: A Compact Explorer For Complex Hierarchies", IEEE, pp. 87-92 (1996).
Bergstrom, "A family of delphi components for case-based reasoning", Proceedings 11th IEEE International Conference on Chicago, (1999), pp. 153-160.
Beyer et al., "When is 'Nearest Neighbor' meaningful, Proceedings of the 7th International Conference on Database Theory", (1999).
Bird et al., "Content-Driven Navigation of Large Databases", The Institution of Electrical Engineers, 1996, pp. 13/1-13/5.
Carey, M. et al., "Info Navigator: A Visualization Tool for Document Searching and Browsing, Proceedings International Conference Distributed Multimedia Systems", (DMS Sep. 2003) pp. 23-28.
Chen et al., "Internet Browsing and Searching: User Evaluations of Category Map and Concept Space Techniques", Wiley InterScience: Journal:Abstract, Jan. 6, 1999.
Chen et al., "Internet Browsing and Searching: User Evaluations of Category Map and Concept Space Techniques," Journal of the American Society for Information Science, vol. 49, pp. 582-603 (1998).
Chen et al., "Object Signatures For Supporting Efficient Navigation In Object-Oriented Databases", Proceeding of the 32nd Hawaii International Conference on System Sciences, IEEE, pp. 502-507 (1997).
Chen et al., "Online Query Refinement on Information Retrieval Systems""A Process Model of Searcher/System Interactions", MID Department, University of Arizona, pp. 115-133 (1990).
Cilibrasi, R. et al., "Automatic Meaning Discovery Using Google", 31 pages, www.bsik-bricks.nl/events/ab/google_abstract.html. www.arxiv.org/abs/cs.CL0412098 (2004).
Diamantini et al., "A conceptual indexing method for content-based retrieval", Database and Expert Systems Applications. Proceedings Tenth Workshop on Florence Italy, (1999), pp. 192-197.
Ellis, GP et al., "Hibrowse for Hotels: bridging the gap between user and system views of a database", extracts from a paper giving an overview of the Hibrowse for Hotels application.http://web.archive.org/ web/19991109234626//.hud.ac.uk/school . . . 4 pages.
European Search Authority, European Search Report for European Patent Application No. 01945997.3, dated May 23, 2007, 6 pages.
Fua et al., "Structure-Based Brushes: A Mechanism For Navigating Hierarchically Organized Data and Information Spaces", IEEE Transactions on Visualization and Computer Graphics, vol. 6, No. 2, pp. 150-159, Apr.-Jun. 2000.
Garcia-Molina et al., "The Query Compiler" Database System Implementation, 2000, Prentice Hall, Upper Saddle River, NJ, USA, XP002423997, pp. 329-364.
Gil et al., "A Visual Interface and Navigator for the P/FDM Object Database", Department of Computing Science, University of Aberdeen, IEEE, pp. 54-63 (1999).
Guha et al., "Rock: A robust clustering algorithm for categorical attributes", Data Engineering Proceedings 15th International Conference on Sidney, (1999), pp. 512-521.

Guttman, "R-Trees: A dynamic index structure for spatial searching", Proceedings of the ACM SIG-MOD Conference, (1984).
Han et al., "Join Index Hierarchy: An Indexing Structure For Efficient Navigation In Object-Oriented Databases", IEEE Transactions on Knowledge and Data Engineering, vol. 11, No. 2, pp. 321-337, Mar./Apr. 1999.
Han-Joon, K. et al., "An effective document clustering method using user-adaptable distance metrics.", SAC, (2002), pp. 16-20.
Hearst's Fall 1999 Course, SIMS 202 Information Organization and Retrieval: http://www2.sims.berkeley.edu/ course/is202/f99/Lectures.html.
Hearst, M. "Chapter 10: User Interfaces and Visualization", Modern Information Retrieval, Yates and Ribeiro-Neto (1999) pp. 257-340.
Hearst, M. et al., "Integrating Browsing & Search Relevance Feedback", SIMS 202, UC Berkeley, SIMS, Fall 1999, 2 pages.
Hearst, M. et al., "Using MetaData in Search: Combining Browsing and Search", 39 slides, http://www2.sims.berkeley.edu/courses/is202/f98/Lecture27/sId001.htm.
Hearst, M., et al. "Cat-a Cone: An Interactive Interface for Specifying Searches and Viewing Retrieval Results Using A Large Category Hierarchy" Ann. Int. ACM-SIGIR Conf. On Res. And Dev. In Information Retrieval, (1997) pp. 246-255.
Hinneburg et al., "What is the nearest neighbor in high dimensional spaces", Proceedings of the 26th VLDB Conference, (2000).
Hongyan Jing, "Information retrieval based on context distance and morphology", Proceedings of the 22nd annual international ACM SIGIR conference on Research and Development in information retrieval, pp. 90-96, Aug. 1999.
http://www.searchtools.com/tools/endeca.html, Search Tools Product Report, "Endeca Faceted Metadata Search and Browse", 2 pages, updated Jul. 10, 2003.
Hua et al., "Object Skeletons: An Efficient Navigation Structure for Object-Oriented Database Systems", IEEE, pp. 508-517 (1994).
International Searching Authority, International Search Report for PCT/US2006/043538, mailed Mar. 26, 2007, 12 pages.
Kummamuru et al., "A Hierarchical Monothetic Document Clustering Algorithm for Summarization and Browsing Search Results", WWW2004, pp. 658-665, May 17-22, 2004.
McEneaney, John E., "Visualizing and Assessing Navigation in Hypertext", Hypertext 99, Darmstadt Germany, pp. 61-70 (1999).
Miller et al., "DataWeb: Customizable Database Publishing for the Web" IEEE Multimedia, 4(4):14-21(1997).
Miller et al., "Integrating Hierarchical Navigation and Querying: A User Customizable Solution" ACM Multimedia Workshop on Effective Abstractions in Multimedia Layout, Presentation, and Interaction, San Francisco, CA, Nov. (1995), pp. 0-7.
Miller, Renee J., "Using Schematically Heterogeneous Structures", Department of Computer and Information Science, Ohio State University, 1998, p. 189-200.
Mills, J., "The Problem of arrangement in a Library, A Modern Outline of Library Classification", Chapman & Hall Ltd, pp. 1-8, 1960.
Pedersen, G.S., "A Browser For Bibliographic Information Retrieval Based On An Application of Lattice Theory" Proc. Of the Ann. Int. SCM SIGIR Conference on Res. And Deve. In Information Retrieval, (1993), pp. 270-279.
Pi-Sheng, "Using case-based reasoning for decision support", Proceedings of the 27th Annual Hawaii International Conference on System Sciences, (1994), pp. 552-561.
Pollitt A.S., "Intelligent Interfaces to online Databases", Expert Systems for Information Management, vol. 3, No. 1, pp. 49-69, 1990.
Pollitt et al., "Faceted-Classification as Pre-Coordinated Subject Indexing: Multi-Dimensional Searching for OPAC Users", Oslo College, May 6-7, 1998.
Pollitt et al., "MenUse for Medicine: End-User Browsing and Searching of Medline via the MeSH Thesaurus", Int. Forum Inf. and Docum., pp. 547-573, 1988.
Pollitt et al., "MenUse for Medicine: End-User Browsing and Searching of Medline via the MeSH Thesaurus", Int. Forum Inf. and Docum., vol. 13, No. 4, pp. 11-17, Oct. 1998.
Pollitt et al., "Multilingual access to document databases", CAIS/ACSI '93 Information as a Global Commodity—Communication, Processing and Use, Proceedings of the 21st Annual Conference of the Canadian Association for Information Science, pp. 128-140, Antigonish, Nova Scotia Canada, Jul. 1993.

Non Final Office Action mailed on Apr. 15, 2008 for U.S. Appl. No. 11/268,868, filed Nov. 8, 2005.

Yahoo Inc., Yahoo!, copyright 1999, http://web.archive.org/web/19991013122821/http://www.yahho.com/, 22 pages.

George Koch and Kevin Loney, "Oracle 8, the Complete Reference," Osborne McGrawHill, p. 68 (1997).

International Search Report and Written Opinion for International Patent Application No. PCt/US07/86150, mailed Jul. 23, 2008.

Office Action Mailed on Feb. 6, 2009 for U.S. Appl. No. 11/271,036 filed on Nov. 10, 2005.

Office Action Mailed on Dec. 30, 2009 for U.S. Appl. No. 11/271,036 filed on Nov. 10, 2005.

Office Action Mailed on May 25, 2010 for U.S. Appl. No. 11/271,036 filed on Nov. 10, 2005.

Office Action Mailed on Nov. 10, 2010 for U.S. Appl. No. 11/271,036 filed on Nov. 10, 2005.

Hearst, "Finding the Flow in Web Search," pub. Sep. 2002, Comm. of the ACM, vol. 45 Iss. 9, p. 42-49.

Office Action Mailed on Jun. 3, 2008 for U.S. Appl. No. 11/606,469 filed on Nov. 30, 2006.

Office Action Mailed on Aug. 31, 2009 for U.S. Appl. No. 11/606,469 filed on Nov. 30, 2006.

Office Action Mailed on May 17, 2010 for U.S. Appl. No. 11/606,469 filed on Nov. 30, 2006.

Office Action Mailed on Apr. 2, 2009 for U.S. Appl. No. 11/606,469 filed on Nov. 30, 2006.

*Antonv. Leouski*et al., "An Evaluation of Techniques for Clustering Search Results", Computer Science Department, University of Massachusetts at Amherst, MA, pp. 1-19, Internet Citation (1996), retrieved on Mar. 7, 2007.

Hua-Jun Zeng et al., "Learning to Cluster Web Search Results," Int'l ACM SIGIR Conf. on Research & Development in Information Retreival, Jul. 25-29, 2004 pp. 210-217.

Oren Zamir et al., "Grouper: A Dynamic Clustering Interface to Web Search Results," Comp Networks and ISDN Systems, May 11, 1999, p. 1361-1374, V. 31, No. 11-16.

Ak Jain et al, "Data Clustering: A Review," ACM Computing Surveys, Sep. 1999, p. 264-323, V. 21, No. 3.

opti-wine.com                                       Keyword Search
                                                    [            ] Find

Begin Your Search...    Your Selection Contains   Displaying results 1-10   30
  22–Wine Types  ▷   21044 Items...
  22–Appellations ▷–24  Page: 1 2 3 4 5 6 7 8 9 10 >>          Next >   ~ 41
  22–Wineries ▷–24  Chardonnay Monterey County        price: $13.00
  22–Year ▷–24      Bold, rich and spicy, with layers of    score: 90-94  ~42
  22–Special Designations ▷–24  complex pear, toast, honey and vanilla
  22–Flavors ▷–24   flavors that are intense and concentrated,
  22–Price Range ▷–24  with a long, full finish. Delicious now.
  22–Regions ▷–24   (12000 cases produced)
  22–Wine Spectator Rating ▷–24  Chardonnay Monterey County     price: $15.00
  22–Body & Characteristics ▷–24  A bold, ripe and full-bodied white from   score: 90-94  ~42
                              California that offers lots of rich pear,
                              spice, honey flavors, all presented with a
                              light shading of hazelnut. This has a sense
                              of elegance and grace that goes on
                              through the finish. (22000 cases
                              produced)

/ 20

Marinus Carmel Valley                                       price: $30.00
Young, tight and well focused, with rich,                   score: 90-94  ~42
complex flavors of spicy currant, cedar,
leather, anise and berry at the core, it
unfolds slowly to reveal some exotic spice
and mineral notes. Given the level of
intensity, it's best to cellar this one unt

/ 10

Sauvignon Blanc Monterey County                             price: $10.00
Bright and pure, pouring out its generous                   score: 90-94  ~42
pear, pineapple and citrus flavors. An
incredible value in a California white
that's fresh and lively through the long
finish. Delicious now. (2700 cases
produced)

Chardonnay Monterey County                                  price: $17.00
A big, ripe Chardonnay, with an                             score: 90-94  ~42
abundance of rich pear, citrus, oak and
spice notes. Turns smooth and spicy on
the finish, where the flavors fan out.
(14676 cases produced)

Sauvignon Blanc Monterey County                             price: $12.00
Smooth, rich and buttery, a spicy wine                      score: 90-94  ~42
with generous layers of pear, honey and
exotic tropical fruit character sneaking in
on the silky finish. Ready now. (2100
cases produced)

Chardonnay Monterey County                                  price: $18.00
Distinct for its bright citrus, especially                  score: 90-94  ~42
lemony, flavors, this well-crafted white
also offers touches of pear, spice, earth
and oak, holding its focus while gaining
nuances of oak and hazelnut.
Delicious.Drink now through 2001. (35500
cases produ Merlot Monterey                                             price: $9.00
Ripe plum and black cherry here, with                       score: 80-89  ~42
touches of charry oak and spice on the
finish.Drink now. (4500 cases produced)

Chardonnay Monterey County La                               price: $14.00
Reina Vineyard                                              score: 90-94  ~42
Rich in texture and full of fruit and butter
flavors. The oak is evident, b ut there are
ample pear, apricot, butterscotch and
spice for complexity. We ll-rounded in the
mouth and well-balanced with acidity,
making the flavors vivid and the feel

FIG. 1 opti-wine.com                                                        Keyword Search 24      44                                    [          ]   Find
Begin Your Search...    Your Selection Contains
                                                    Displaying results 1-10    30
   22 – Wine Types  ▷   21044 Items...
   22 – Appellations ▷   Page: 1 2 3 4 5 6 7 8 9 10 >>              Next >   — 41
              Wineries ▷  24
                        Chardonnay Monterey County           price: $13.00
                 Year ▷   Bold, rich and spicy, with layers of   score: 90-94  — 42
                          complex pear, toast, honey and vanilla
   Special Designations ▷ flavors that are intense and concentrated,
                          with a long, full finish. Delicious now.
              Flavors ▷   (12000 cases produced)
          Price Range ▷
                        Chardonnay Monterey County           price: $15.00
          22 – Regions ◁ | Argentine Regions   | odied white from   score: 90-94  — 42
   Wine Spectator Rating ▷ | Australian Regions | lots of rich pear,
                          | Austrian Regions   | all presented with a
   Body & Characteristics ▷ | Canadian Regions  | nut. This has a sense
                          | Chilean Regions    | that goes on
              26 ——      | Croatia            | 2000 cases
                  28 – | French Regions     |
                  28 – | German Regions     | ey
                  28 – | Greek Regions      |               price: $30.00
                  28 – | Hungarian Regions  | focused, with rich,   score: 90-94
 /                        icy currant, cedar,
20                        leather, anise and berry at the core, it
                          unfolds slowly to reveal some exotic spice
                          and mineral notes. Given the level of
                          intensity, it's best to cellar this one unt Sauvignon Blanc Monterey County   price: $10.00
                          Bright and pure, pouring out its generous   score: 90-94
                          pear, pineapple and citrus flavors. An
                          incredible value in a California white
                          that's fresh and lively through the long
   /                      finish. Delicious now. (2700 cases
  10                      produced)

Chardonnay Monterey County           price: $17.00
                          A big, ripe Chardonnay, with an            score: 90-94
                          abundance of rich pear, citrus, oak and
                          spice notes. Turns smooth and spicy on
                          the finish, where the flavors fan out.
                          (14676 cases produced)

Sauvignon Blanc Monterey County   price: $12.00
                          Smooth, rich and buttery, a spicy wine     score: 90-94
                          with generous layers of pear, honey and
                          exotic tropical fruit character sneaking in
                          on the silky finish. Ready now. (2100
                          cases produced)

Chardonnay Monterey County           price: $18.00
                          Distinct for its bright citrus, especially   score: 90-94
                          lemony, flavors, this well-crafted white
                          also offers touches of pear, spice, earth
                          and oak, holding its focus while gaining
                          nuances of oak and hazelnut.
                          Delicious.Drink now through 2001. (35500
                          cases produ Merlot Monterey                      price: $9.00
                          Ripe plum and black cherry here, with      score: 80-89
                          touches of charry oak and spice on the
                          finish.Drink now. (4500 cases produced)

Chardonnay Monterey County La      price: $14.00
                        Reina Vineyard                     score: 90-94
                          Rich in texture and full of fruit and butter
                          flavors. The oak is evident, b ut there are
                          ample pear, apricot, butterscotch and
   FIG. 2                 spice for complexity. We ll-rounded in the
                          mouth and well-balanced with acidity,
                          making the flavors vivid and the feel opti-wine.com

Current Selection...

⌑ Regions > /52
French Regions
54 ⎡ Remove Terms ⎤ /56

Narrow My Selection...

22 – Wine Types ▷ – 24
22 – Appellations ▷ – 24
Wineries ▷
Year ▷
Special Designations ▷
25 – French Vineyards ▷
Flavors ▷
Price Range ▷
23 – French Regions ▷
Wine Spectator Rating ▷
Body & Characteristics ▷

/ 20

/ 10

50 / 44
Your Selection Contains 8774 Items...
Page: 1 2 3 4 5 6 7 8 9 10 >>

A.R. Lenoble Blanc de Blancs
Grand Cru, Champagne
(No Description Available)

Ayala Brut, Champagne
(No Description Available)

Bollinger Special Cuvée Brut
Champagne
(No Description Available)

Charles Ellner Réserve Brut
Champagne, Épernay
(No Description Available)

Domaine J. Laurens, Blanc de
Blancs Brut, Crémant de Limoux,
(No Description Available)

G.H. Mumm Cordon Rouge Brut
Champagne, Reims
(No Description Available)

Gatinois Brut Reserve
Champagne, Aÿ
(No Description Available)

Gatinois Brut Tradition
Champagne, Aÿ
(No Description Available)

Laurent-Perrier Brut, 1.5 Liter,
Champagne, France
(No Description Available)

Laurent-Perrier Demi-Sec,
375ml, Champagne, France
(No Description Available)

Keyword Search
⎡ ⎤
\ 30

Displaying results 1-10

Next > — 41 price: N/A
score: N/A
Available for Purchase — 42 price: N/A
score: N/A — 42
Available for Purchase price: N/A
score: N/A
Available for Purchase price: N/A
score: N/A
Available for Purchase price: N/A
score: N/A
Available for Purchase price: N/A
score: N/A
Available for Purchase price: N/A
score: N/A
Available for Purchase price: N/A
score: N/A
Available for Purchase price: N/A
score: N/A
Available for Purchase price: N/A
score: N/A
Available for Purchase Next >

FIG. 3 opti-wine.com

Current Selection...

🏳 Flavors > /—52
 Spice and Floral Flavors >
54 Pepper—52

🏳 Regions > /—52
54 Portugesé Regions

[ Remove Terms ]—56

Narrow My Selection...

27—Wine Types ▷—24
22—Appellations ▷—24
 Wineries ▷
 Year ▷
 Special Designations ▷ 26
 Price Range ▷
23—Portugese Regions ◁ | Central Portugal |
27—Wine Spectator Rating ▷ | Other Portuguese Region |
 Body & Characteristics ▷ \28

44
/
**Your Selection
Contains 12 Items...**
Page: 1 2

Baga Bairrada Marques de
Marialva Reserva
 Distinctive aromas and flavors of wild
 berries, black pepper and cardamom
 enliven this dry, tannic red, whose
 flavors linger on the finish.Drink now
 through 1999.

Dão Meia Encosta
 Highlights of red cherry and
 raspberry are elegantly displayed,
 with lively acidity and a touch of black
 pepper on the finish.Drink now.
 (67000 cases produced)

Late Bottled Port
 Earthy and spicy but a bit oxidized,
 with pepper, leather and cedar
 character. Medium-bodied, sweet and
 juicy, with a nutty finish. Tastes older edos
 elicious.
 and fruity in
 smooth texture
 alcohol and young
 ish echoes black
 te. Tempting to
 ltiness, but proba Vintage Port
 A solid Graham, with lots of fruit and
 spice on the nose. Full-bodied and
 medium sweet, with chewy tannins
 and a pepper and berry aftertaste.

Chardonnay Terras do Sado Cova
da Ursa
 Already mature-tasting, despite its
 youth, with butter and ripe apple
 flavors. Notes of white pepper on the
 finish.Drink now.

Late Bottled Port
 Medium-bodied and very sweet, with
 raisin and spice character and
 chocolate, pepper and sweet-and-
 sour flavors on the finish. Lacks a bit
 of freshness.Drink now.

Late Bottled Port
 Intense aromas of black pepper and
 raisin, but then a slight letdown.
 Medium-bodied and medium sweet,
 with soft tannins and a light, slightly
 alcoholic finish.Drink now. (1215
 cases produced)

Late Bottled Port
 Pretty cherry and floral aromas, with
 a hint of pepper. Of medium body
 and sweetness, with an earthy,
 slightly nutty finish.Drink now.

Vintage Port
 Another Port shipper once mistook
 this extraordinary wine for one 15
 years older. (2215 cases produced)

Keyword Search
[          ]  Find
       \
Displaying results 1-10  30

Next >  — 41 price: $12.00
score: 80-89  —42 price: $7.00
score: 80-89  —42 price: $18.00
score: 80-89 price: $26.00
score: 90-94 price: N/A
score: 90-94 price: N/A
score: 80-89 price: $20.00
score: 80-89 price: $20.00
score: 80-89 price: $17.00
score: 80-89 price: $250.00
score: 95-100 opti-wine.com  50

Keyword Search ⬚ Find

Current Selection...

⌕ Flavors > /52
54 Wood and Nut Flavors

[ Remove Terms ]—56

Narrow My Selection...

22—Wine Types ▷﹨24
22—Appellations ▷﹨24
Wineries ▷
Year ▷
Special Designations ▷
Wood and Nut Flavors ◁
Price Range ▷
23
Regions ▷
Wine Spectator Rating ▷
Body & Characteristics ▷
26—
28—
28—

/
20

44
Your Selection Contains 5438 Items...   Displaying results 1-10

Page: 1 2 3 4 5 6 7 8 9 10 >>      Next >﹨41

Chardonnay Monterey County     price: $13.00
Bold, rich and spicy, with layers of     score: 90-94 ﹨42
complex pear, toast, honey and
vanilla flavors that are intense and
concentrated, with a long, full finish.
Delicious now. (12000 cases
produced)

Chardonnay Monterey County     price: $15.00
A bold, ripe and full-bodied white from     score: 90-94 ﹨42
California that offers lots of rich pear,
spice, honey flavors, all presented
with a light shading of hazelnut. This

| Almond |
| Burnt |
| Cedar |
| Coffee |
| Hazelnut |
| Leafy |
| Nutty |
| Oak |
| Pine |
| Resinous | sense of elegance and grace
goes on through the finish.
00 cases produced)

us Carmel Valley    price: $30.00
g, tight and well focused, with    score: 90-94
complex flavors of spicy currant,
, leather, anise and berry at the
It unfolds slowly to reveal some
spice and mineral notes. Given
vel of intensity, it's best to cellar
this one unt Chardonnay Monterey County     price: $18.00
Distinct for its bright citrus, especially     score: 90-94
lemony, flavors, this well-crafted
white also offers touches of pear,
spice, earth and oak, holding its focus
while gaining nuances of oak and
hazelnut. Delicious. Drink now through
2001. (35500 cases produ Chardonnay Santa Cruz Mountains  price: $23.00
Special Reserve Vineyards Spring  score: 90-94
Ridge Vineyard
Smooth, rich and creamy, with an
alluring, substantial core of pear,
spice, honey and vanilla. Altogether
impressive for its complexity and
finesse. (400 cases produced)

Chardonnay Santa Cruz Mountains  price: $20.00
Displays wonderful aromas and rich,  score: 90-94
complex flavors, serving up a
mouthful of creamy pear, smoke, fig
and melon, adding a dash of hazelnut
and spice. Finishes with a long, zesty
aftertaste. (600 cases produced)

Chardonnay Santa Cruz Mountains  price: $24.00
Dirk Vineyard Special Reserve  score: 90-94
Vineyards
Smooth and polished, with a creamy
core of ripe pear, apple, spice and
hazelnut flavors that stay lively
through the finish, where the hazelnut
and anise become more pronounced.
(300 cases produced)

Chardonnay Santa Cruz Mountains  price: $24.00
Bald Mountain Vineyard Special  score: 90-94
Reserve Vineyards
Smooth, ripe, rich and creamy, with
clearly focused, pear, anise, butter

FIG. 5 opti-wine.com

Current Selection...

☐ Flavors >
  Spice and Floral Flavors >
  Pepper
☑ Regions >
  Portugese Regions >
  Central Portugal

[ Remove Terms ]

Narrow My Selection...

Appellations ▷
Wineries ▷
Year ▷
Special Designations ▷
Price Range ▷

Your Selection Contains 3 Items...

Page: 1

Baga Bairrada Marques de Marialva Reserva
price: $12.00
score: 80-89
Distinctive aromas and flavors of wild berries, black pepper and cardamom enliven this dry, tannic red, whose flavors linger on the finish. Drink now through 1999.

Dao Meia Encosta
price: $7.00
score: 80-89
Highlights of red cherry and raspberry are elegantly displayed, with lively acidity and a touch of black pepper on the finish. Drink now. (67000 cases produced)

Dao Reserva
price: $12.00
score: 80-89
A juicy red, on the light side, with plenty of appealing berry and currant flavors. Finishes with some pepper and leather notes. Drink now.

Keyword Search
[            ] Find

Displaying results 1-3

△ Other Characteristics That These Items Have In Common

| Wine Types: | Appellational Wines |
| Wine Spectator Rating: | 80-89 |

FIG. 6 opti-wine.com

Keyword Search

[ ] Find
30

Begin Your Search... 24

Your Selection Contains 2337 Items... /28   44

Displaying results 1-10

22 — Wine Types ▷

22 — Appellations ◁

Wineries ▷

Year ▷

Special Designations ▷

Flavors ▷

Price Range (Wine) ▷

Regions ▷

Wine Spectator Range ▷

Body & Characteristics ▷

| Adelaide Hills |
| Alexander Valley — 29 |
| Alicante — 28 |
| Alsace |
| Alsace Grand Cru — 28 |
| Amarone della Valpolicella — 28 |
| Anderson Valley — 28 |
| Arroyo Grande Valley — 28 |
| Arroyo Seco — 28 |
| Arzig — 28 |

Next >  — 41 ce: $3.00
core: N/A  42 e: $15.00
re: 90-94  42

/
20

/
10

26 Cabernet Sauvignon Napa Valley
Awkward in aroma when first poured, but it has plenty of vigor in the firm tannins and deep flavors of cherry, tomato and spice. By the end of the tasting, it had blossomed into a well-aged, harmonious wine. Drink now.--Chappellet Cabernet vertical.

price: $105.00
score: 90-94

Zinfandel Paso Robles Dusi Ranch
(No Description Available)

price: $9.00
score: N/A

Cabernet Sauvignon Napa Valley
An outstanding wine from a great vintage for California Cabernet. A big bouquet of meaty, herbal, toasty aromas gives way to lively fruit flavors and a firm, fresh texture. Drink now through 1996.--Chappellet Cabernet vertical.

price: $95.00
score: 90-94  42

Petite Sirah Napa Valley
(No Description Available)

price: N/A
score: 90-94

Cabernet Sauvignon Napa Valley Red Rock Terrace
Very complex, with a broad range of earthy currant, plum, berry, sage and spice flavors. Long, intricate, lingering aftertaste.--Diamond Creek vertical.

price: N/A
score: 90-94

Cabernet Sauvignon Napa Valley Volcanic Hill
Austere, with a thin band of mature Cabernet flavors. Less complex, flavorful and interesting than the 1972.--Diamond Creek vertical.

price: N/A
score: 80-89

FIG. 7 opti-wine.com

Current Selection...

☐ /54  /52
Wine Spectator Range >
95-100

/56
[ Remove Terms ]

Narrow Your Selection...

22 — Appellations ◁
22 — Wineries ▷
Year ▷
United States Vineyards ▷
60  California Regions ▷
/
Other Common Feature

Wine Types:
 Cabernet Sauvignon
Regions:
 California Regions

/50
/44
Your Selection
Contains 4   Displaying results 1-4
Items...
Page: 1

Cabernet Sauvignon
Napa Valley
(No Description
Available)

Cabernet Sauvignon
| Alexander Valley |
| Napa Valley | )tion
29 uvignon
)tion

26 uvignon
Alexander Valley Robert
Young Vineyards
(No Description
Available)

Keyword Search
[                    ] Find
30

~ 41 price: $74.00
score: 95- ~42
100 price: N/A ~42
score: 95-
100 price: $13.00
score: 95-
100 price: $18.00
score: 95-
100

/
10

FIG. 8 opti-wine.com

Keyword Search red ·    Find

We found 6 terms that might match what you're looking for. Please select a specific term to search with...

Begin Your Search...

22 — Wine Types ▷
22 — Appellations ▷
    Wineries ▷
        Year ▷
Special Designations ▷
     Flavors ▷
   Price Range ▷
     Regions ▷
Wine Spectator Rating ▷
Body & Characteristics ▷

20

10

44 — Your Selection
24 — Contains 21064 Items...   Displaying results 1-10

Page: 1 2 3 4 5 6 7 8 9 10 >>    Next >

▷24 Chardonnay Monterey County    price: N/A   score: N/A
Bold, rich and spicy, with layers of complex pear, toast, honey and vanilla flavors that are intense and concentrated, with a long, full finish. Delicious now. (12000 cases produced)

Chardonnay Monterey County    price: N/A   score: N/A
A bold, ripe and full-bodied white from California that offers lots of rich pear, spice, honey flavors, all presented with a light shading of hazelnut. This has a sense of elegance and grace that goes on through the finish. (22000 cases produced)

Marinus Carmel Valley    price: N/A   score: N/A
Young, tight and well focused, with rich, complex flavors of spicy currant, cedar, leather, anise and berry at the core, it unfolds slowly to reveal some exotic spice and mineral notes. Given the level of intensity, it's best to cellar this one unt Sauvignon Blanc Monterey County    price: N/A   score: N/A
Bright and pure, pouring out its generous pear, pineapple and citrus flavors. An incredible value in a California white that's fresh and lively through the long finish. Delicious now. (2700 cases produced)

Chardonnay Monterey County    price: N/A   score: N/A
A big, ripe Chardonnay, with an abundance of rich pear, citrus, oak and spice notes. Turns smooth and spicy on the finish, where the flavors fan out. (14676 cases produced)

Sauvignon Blanc Monterey County    price: N/A   score: N/A
Smooth, rich and buttery, a spicy wine with generous layers of pear, honey and exotic tropical fruit character sneaking in on the silky finish. Ready now. (2100 cases produced)

41

42

42

34 — Wine Types
36 — Red Wines
    Red Wines, Other
    Bordeaux (Red)
34 — Wineries
    Green & Red
    Red Hill
    Vineyards
36 — Red Rock Terrace 32    Close Results

FIG. 9 opti-wine.com					Keyword Search

[                    ] Find
					)
Return to Browsing			30

Chardonnay Monterey County					70

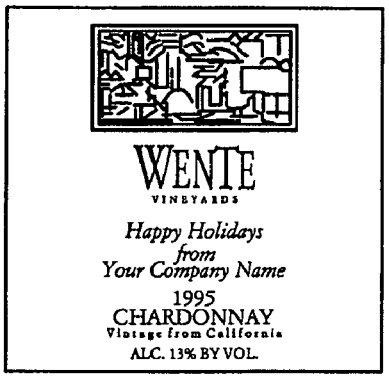

A bold, ripe and full-bodied white from California that offers lots of rich pear, spice, honey flavors, all presented with a light shading of hazelnut. This has a sense of elegance and grace that goes on through the finish. (22000 cases produced)

72

| | |
|---|---|
| Wine Types | ☐ Chardonnay — 74 |
| Wineries | ☐ Bernardus — 74 |
| Year | ☐ 1994 |
| Flavors | ☐ Hazelnut, ☐ Spice |
| Price Range | ☐ $10-$15 |
| Regions | ☐ US Regions |
| Wine Spectator Rating | ☐ 90-94 |

The characteristics above have been used to describe this bottle of wine. Select any combination of different characteristics to see similar bottles of wine...

10

[ Build My Store ]

FIG. 10

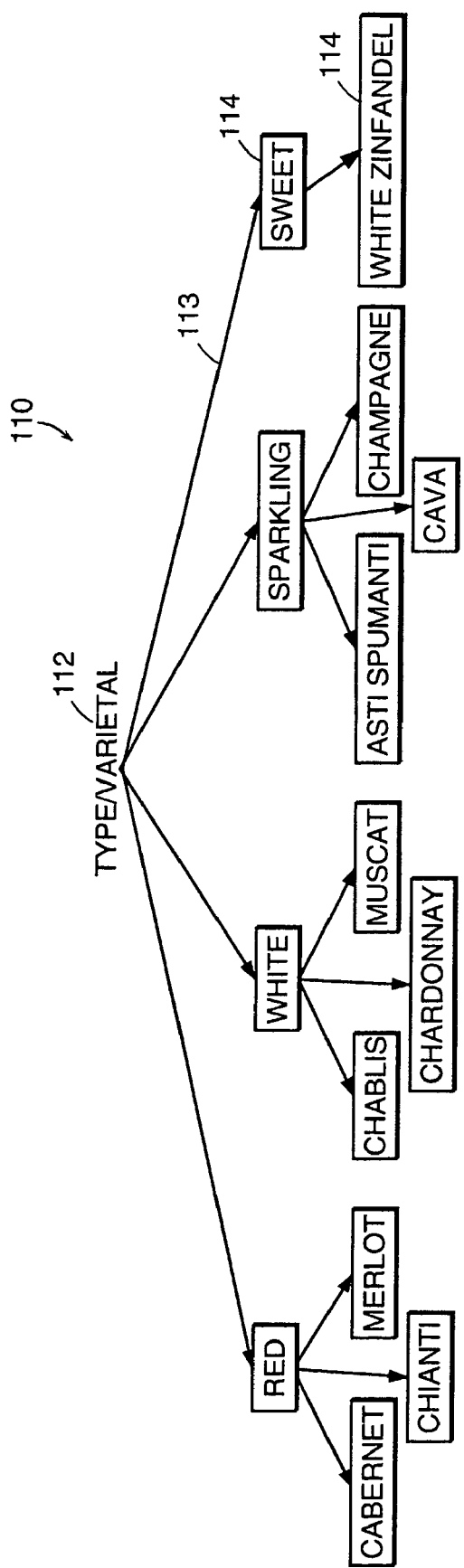
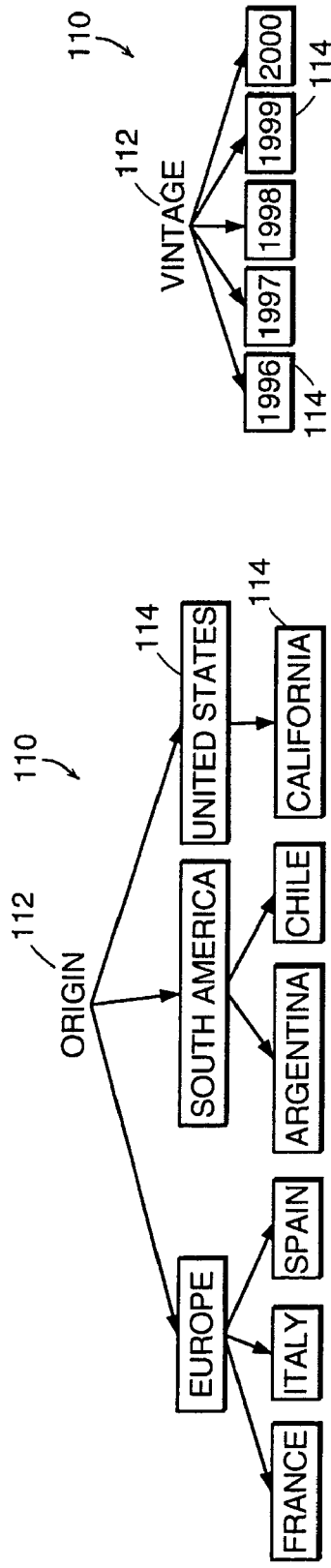
FIG. 11A
FIG. 11B
FIG. 11C

| Doc# | Text Description | Terms |
|---|---|---|
| 1 | Trapiche (award-winning Argentine wine) | Merlot, Argentina, 1998 |
| 2 | Bully Hill (New York's best) | Chardonnay, United States, 1999 |
| 3 | Martini & Rossi Asti Spumante | Asti Spumante, Italy |
| 4 | Gato Negro ("black cat") | Red, Chile |
| 5 | Gato Blanco ("white cat") | White, Chile |
| 6 | Chianti "Classico Riserva" Piccini | Chianti, Italy, 1997 |
| 7 | Gekeikan USA domestic sake | Sweet, California |
| 8 | Camernet (Cabernet Franc) | Cabernet, France, 1996 |
| 9 | Carlo Rossi Chablis (4 L) | Chablis, California |
| 10 | Freixenet Cordon Negro (gift box) | Cava, Spain |
| 11 | George DuBoeuf Beaujolais Nouveaux | Red, France, 2000 |

FIG. 13

HIERARCHICAL DATA-DRIVEN NAVIGATION SYSTEM AND METHOD FOR INFORMATION RETRIEVAL

CROSS REFERENCE TO RELATED APPLICATIONS

This application is a divisional of U.S. patent application Ser. No. 11/268,868 filed Nov. 8, 2005, which is a divisional of U.S. application Ser. No. 09/573,305 filed May 18, 2000, now U.S. Pat. No. 7,035,864, issued Apr. 25, 2006.

FIELD OF THE INVENTION

The present invention generally relates to information navigation systems and search engines.

BACKGROUND OF THE INVENTION

Information retrieval from a database of information is an increasingly challenging problem, particularly on the World Wide Web (WWW), as increased computing power and networking infrastructure allow the aggregation of large amounts of information and widespread access to that information. A goal of the information retrieval process is to allow the identification of materials of interest to users.

As the number of materials that users may search increases, identifying materials relevant to the search becomes increasingly important, but also increasingly difficult. Challenges posed by the information retrieval process include providing an intuitive, flexible user interface and completely and accurately identifying materials relevant to the user's needs within a reasonable amount of time. The information retrieval process comprehends two interrelated technical aspects, namely, information organization and access.

Current information navigation systems usually follow one of three paradigms. One type of information navigation system employs a database query system. In a typical database query system, a user formulates a structured query by specifying values for fixed data fields, and the system enumerates the documents whose data fields contain those values. PriceSCAN.com uses such an interface, for example. Generally, a database query system presents users with a form-based interface, converts the form input into a query in a formal database language, such as SQL, and then executes the query on a relational database management system. Disadvantages of typical query-based systems include that they allow users to make queries that return no documents and that they offer query modification options that lead only to further restriction of the result set (the documents that correspond to the user's search specifications), rather than to expansion or extension of the result set.

A second type of information navigation system is a free-text search engine. In a typical free-text search engine, the user enters an arbitrary text string, often in the form of a Boolean expression, and the system responds by enumerating the documents that contain matching text. Google.com, for example, includes a free-text search engine. Generally a free-text search engine presents users with a search form, often a single line, and processes queries using a precomputed index. Generally this index associates each document with a large portion of the words contained in that document, without substantive consideration of the document's content. Accordingly, the result set is often a voluminous, disorganized list that mixes relevant and irrelevant documents. Although variations have been developed that attempt to determine the objective of the user's query and to provide relevance rankings to the result set or to otherwise narrow or organize the result set, these systems are limited and unreliable in achieving these objectives.

A third type of information navigation system is a tree-based directory. In a tree-based directory, the user generally starts at the root node of the tree and specifies a query by successively selecting refining branches that lead to other nodes in the tree. Shopping.yahoo.com uses a tree-based directory, for example. In a typical implementation, the hard-coded tree is stored in a data structure, and the same or another data structure maps documents to the node or nodes of the tree where they are located. A particular document is typically accessible from only one or, at most, a few, paths through the tree. The collection of navigation states is relatively static—while documents are commonly added to nodes in the directory, the structure of the directory typically remains the same. In a pure tree-based directory, the directory nodes are arranged such that there is a single root node from which all users start, and every other directory node can only be reached via a unique sequence of branches that the user selects from the root node. Such a directory imposes the limitation that the branches of the tree must be navigationally disjoint—even though the way that documents are assigned to the disjoint branches may not be intuitive to users. It is possible to address this rigidity by adding additional links to convert the tree to a directed acyclic graph. Updating the directory structure remains a difficult task, and leaf nodes are especially prone to end up with large numbers of corresponding documents.

In all of these types of navigation systems, it may be difficult for a user to revise a query effectively after viewing its result set. In a database query system, users can add or remove terms from the query, but it is generally difficult for users to avoid underspecified queries (i.e. too many results) or over-specified queries (i.e. no results). The same problem arises in free-text search engines. In tree-based directories, the only means for users to revise a query is either to narrow it by selecting a branch or to generalize it by backing up to a previous branch.

Various other systems for information retrieval are also available. For example. U.S. Pat. Nos. 5,715,444 and 5,983,219 to Danish et al., both entitled "Method and System for Executing a Guided Parametric Search," disclose an interface for identifying a single item from a family of items. The interface provides users with a set of lists of features present in the family of items and identifies items that satisfy selected features.

SUMMARY OF THE INVENTION

The present invention, a hierarchical, data-driven information navigation system and method, enables the navigation of a collection of documents or other materials using certain common attributes associated with those materials. The navigation system interface allows the user to select values for the attributes associated with the materials in the current navigation state and returns the materials that correspond to the user's selections. The present invention enables this navigation mode by associating terms (attribute-value pairs) with the documents, defining a set of hierarchical refinement relationships (i.e., a partial order) among the terms, and providing a guided navigation mechanism based on the association of terms with documents and the relationships among the terms.

The present invention includes several components and features relating to a hierarchical data-driven navigation system. Among these are a user interface, a knowledge base, a process for generating and maintaining the knowledge base, a navigable data structure and method for generating the data structure, WWW-based applications of the system, and methods of implementing the system. Although the invention is described herein primarily with reference to a WWW-based system for navigating a product database, it should be understood that a similar navigation system could be employed in any database context where materials may be associated with terms and users can identify materials of interest by way of those terms.

The present invention uses a knowledge base of information regarding the collection of materials to formulate and to adapt the interface to guide the user through the collection of navigation states by providing relevant navigation options. The knowledge base includes an enumeration of attributes relevant to the materials, a range of values for each attribute, and a representation of the partial order that relates terms (the attribute-value pairs). Attribute-value pairs for materials relating to entertainment, for example, may be Products: Movies and Director: Spike Lee. (Attribute-value pairs are represented throughout this specification in this Attribute: Value format; navigation states are represented as bracketed sets of attribute-value pairs.) The knowledge base also includes a classification mapping that associates each item in the collection of materials with a set of terms that characterize that item.

The knowledge base is typically organized by domains, which are sets of materials that conform to natural groupings. Preferably, a domain is chosen such that a manageable number of attributes suffice to effectively distinguish and to navigate among the materials in that domain. The knowledge base preferably includes a characterization of each domain, which might include rules or default expectations concerning the classification of documents in that domain. A particular item may be in more than one domain.

The present invention includes a user interface for navigation. The user interface preferably presents the user's navigation state as a set of terms organized by attribute. For a given set of terms, the user interface presents materials that are associated with those terms and presents relevant navigation options for narrowing or for generalizing the navigation state. In one aspect of the present invention, users navigate through the collection of materials by selecting and deselecting terms.

In one aspect of the present invention, the user interface responds immediately to the selection or the deselection of terms, rather than waiting for the user to construct and to submit a comprehensive query composed of multiple terms. Once a query has been executed, the user may narrow the navigation state by selecting additional terms, or by refining existing terms. Alternatively, the user may broaden the navigation state by deselecting terms that have already been selected or by generalizing the terms. In preferred embodiments, the user may broaden the navigation state by deselecting terms in an order different from that in which they were selected. For example, a user could start at {Products: Movies}, narrow by selecting an additional term to {Products: Movies; Genre: Drama}, narrow again to {Products: Movies; Genre: Drama; Director: Spike Lee}, and then broaden by deselecting a term to {Products: Movies; Director: Spike Lee}.

In another aspect of the present invention, the user interface allows users to use free-text search to find terms of interest. In another aspect of the present invention, the user interface also allows users to use free-text search on descriptive information associated with the materials.

In another aspect of the present invention, the user interface presents users with context-dependent navigation options for narrowing the navigation state. The user interface does not present the user with terms whose selection would correspond to no documents in the resulting navigation state. The user interface presents the user only with terms that are associated with at least one item in the present navigation state. Also, the user interface presents new navigation options as they become relevant. The knowledge base may contain rules that determine when particular attributes or terms are made available to users for navigation.

In another aspect of the invention—for example, when the materials correspond to products available for purchase from various sources—the knowledge base includes a catalog of canonical representations that have been aggregated from the materials.

In another aspect of the invention, the knowledge base may include definitions of stores, sets of materials that are grouped to be searchable at one time. A store may include documents from one or more domains. An item may be assigned to more than one store. The knowledge base may also include rules to customize navigation for particular stores.

In another aspect of the invention, the knowledge base is developed through a multi-stage, iterative process. Workflow management allocates resources to maximize the efficiency of generating and of maintaining the knowledge base.

The knowledge base is used to generate data structures that support navigation through a collection of materials. In one aspect of the invention, the navigation system consists of a hierarchy (i.e., a partial order) of navigation states that map sets of terms to the sets of materials with which those terms are associated. In another aspect of the invention, the navigation states are related by transitions corresponding to terms used to narrow from one navigation state to another. The navigation states may be fully or partially precomputed, or may be entirely computed at run-time.

BRIEF DESCRIPTION OF THE DRAWINGS

The invention, including these and other features thereof, may be more fully understood from the following description and accompanying drawings, in which:

FIG. 1 is a view of a user interface to a navigation system in accordance with an embodiment of the present invention.

FIG. 2 is a view of the user interface of FIG. 1, showing a drop-down pick list of navigable terms.

FIG. 3 is a view of the user interface of FIG. 1, showing a navigation state.

FIG. 4 is a view of the user interface of FIG. 1, showing a navigation state.

FIG. 5 is a view of the user interface of FIG. 1, showing a navigation state.

FIG. 6 is a view of the user interface of FIG. 1, showing a navigation state.

FIG. 7 is a view of the user interface of FIG. 1, showing a navigation state.

FIG. 8 is a view of the user interface of FIG. 1, showing a navigation state.

FIG. 9 is a view of the user interface of FIG. 1, showing the result of a free-text search for terms.

FIG. 10 is a view of the user interface of FIG. 1, showing information about a particular document.

FIGS. 11A-C are representative examples of how the range of values for an attribute could be partially ordered in accordance with an embodiment of the present invention.

FIG. 13 is a table illustrating how a set of documents may be classified in accordance with an embodiment of the present invention.

DETAILED DESCRIPTION OF THE PREFERRED EMBODIMENTS

User Interface

Figure 12:
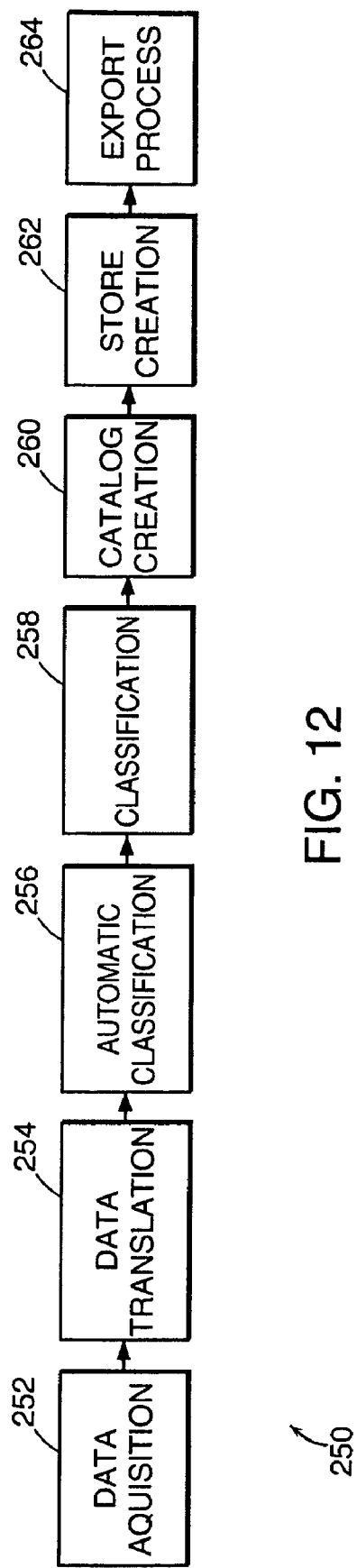
FIG. 12 is a block diagram of a process for collecting and classifying documents in accordance with an embodiment of the present invention.

In accordance with one embodiment of the present invention, FIG. 1 shows a user interface 10 to a hierarchical, data-driven navigation system. The navigation system operates on a collection of documents defined in a knowledge base. As is shown, the user is preferably presented with at least two alternative methods of using the navigation system: (1) by selecting terms to navigate through the collection of documents, or (2) by entering a desired keyword in a search box.

The navigation system preferably organizes documents by domain. In accordance with one embodiment of the present invention, the user interface 10 shown in FIGS. 1-10 is operating on a set of documents that are part of a wine domain. Preferably, a domain defines a portion of the collection of documents that reflects a natural grouping. Generally, the set of attributes used to classify documents in a domain will be a manageable subset of the attributes used to classify the entire collection of documents. A domain definition may be a type of product, e.g., wines or consumer electronics. A domain may be divided into subdomains to further organize the collection of documents. For example, there can be a consumer electronics domain that is divided into the subdomains of televisions, stereo equipment, etc. Documents may correspond to goods or services.

The user interface may allow users to navigate in one domain at a time. Alternatively, the user interface may allow the simultaneous navigation of multiple domains, particularly when certain attributes are common to multiple domains.

The user interface allows the user to navigate through a collection of navigation states. Each state is composed of a set of terms and of the set of documents associated with those terms. Users navigate through the collection of navigation states by selecting and deselecting terms to obtain the navigation state corresponding to each set of selected terms. Preferably, as in FIG. 4, the user interface 10 presents a navigation state by displaying both the list 50 of terms 52 and a list 41 of some or all of the documents 42 that correspond to that state. Preferably, the user interface presents the terms 52 of the navigation state organized by attribute. Preferably, the initial navigation state is a root state that corresponds to no term selections and, therefore, to all of the documents in the collection.

As shown in FIG. 2, the user interface 10 allows users to narrow the navigation state by choosing a value 28 for an attribute 22, or by replacing the currently selected value with a more specific one (if appropriate). Preferably, the user interface 10 presents users with the options available to narrow the present navigation state, preferably with relevant terms organized by attribute. In some embodiments of the present invention, as shown in FIG. 2, users can select values 28 from drop-down lists 26 denoted by indicators 24, that are organized by attributes 22 in the current navigation state. The user interface may present these navigation options in a variety of formats. For example, values can be presented as pictures or as symbols rather than as text. The interface may allow for any method of selecting terms, e.g., mouse clicks, keyboard strokes, or voice commands. The interface may be provided through various media and devices, such as television or WWW, and telephonic or wireless devices. Although discussed herein primarily as a visual interface, the interface may also include an audio component or be primarily audio-based.

Preferably, in the present navigation state, the user interface only presents options for narrowing the navigation state that lead to a navigation state with at least one document. This preferred criteria for providing navigation options ensures that there are no "dead ends," or navigation states that correspond to an empty result set.

Preferably, the user interface only presents options for narrowing the navigation state if they lead to a navigation state with strictly fewer documents than the present one. Doing so ensures that the user interface does not present the user with choices that are already implied by terms in the current navigation state.

Preferably, the user interface presents a new navigation state as soon as the user has chosen a term 28 to narrow the current navigation state, without any further triggering action by the user. Because the system responds to each user with immediate feedback, the user need not formulate a comprehensive query and then submit the query.

In accordance with one embodiment of the present invention, as shown in FIGS. 3 and 4, the user interface 10 may enable broadening of the current navigation state by allowing the user to remove terms 52 from the list 50 of terms selected. For example, the interface 10 may provide a list 50 with checkboxes 54 for removing selections and a button 56 to trigger the new search. In the illustrated embodiment, the user can remove selected terms 52 in any order and can remove more than one selection 52 at a time.

Preferably, the navigation options presented to the user are context-dependent. For example, terms that refine previously selected terms may become navigation options in the resulting navigation state. For example, referring to FIG. 5, after the term Flavors: Wood and Nut Flavors 52 is selected (the user has selected the value Wood and Nut Flavors 23 for the attribute Flavors), Wood and Nut Flavors 23 then appears in the interface for the new navigation state in the list 20 of attributes and allows selection of values 28 that relate to that specific attribute for further refinement of the query. The user interface may also present certain attributes that were not presented initially, as they become newly relevant. For example, comparing FIG. 3 to FIG. 2, the attribute French Vineyards 25 appears in the list 20 of attributes only after the user has already selected the term Regions: French Regions in a previous navigation state. Attributes may be embedded in this way to as many levels as are desired. Presenting attributes as navigation options when those attributes become relevant avoids overwhelming the user with navigation options before those options are meaningful.

Additionally, for some attributes 22, multiple incomparable (non-refining) selections of values 28 may be applicable. For example, for the attribute Flavor, the values Fruity and Nutty, neither of which refines the other, may both be selected so that the terms Flavors: Fruity and Flavors: Nutty narrow the navigation state. Thus, users may sometimes be able to refine a query by selecting multiple values under a single attribute.

Preferably, certain attributes will be eliminated as navigation options if they are no longer valid or helpful choices. For example, if all of the documents in the result set share a common term (in addition to the term(s) selected to reach the navigation state), then selection of that term will not further refine the result set; thus, the attribute associated with that term is eliminated as a navigation option. For example, comparing FIG. 6 with FIG. 4, the attribute Wine Types 27 has been eliminated as a navigation option because all of the documents 42 in the result set share the same term, Wine Types: Appellational Wines. In preferred embodiments, an additional feature of the interface 10 is that this information is presented to the user as a common characteristic of the documents 42 in the result set. For example, referring to FIG. 6, the interface 10 includes a display 60 that indicates the common characteristics of the documents 42 in the result set. Removing a term as a navigation option when all of the documents in the result set share that term prevents the user from wasting time by selecting terms that do not refine the result set.

Preferably, the user interface also eliminates values as navigation options if their selection would result in no documents in the result set. For example, comparing FIG. 8 to FIG. 7, after the user selects the term Wine Spectator Range: 95-100, the user interface eliminates as navigation options all the values 28, 29 in the list 26 of values for the attribute Appellations 22 except for the values Alexander Valley 29 and Napa Valley 29. Alexander Valley 29 and Napa Valley 29 are the only two values in the list 26 of values for the attribute Appellations that return at least one document in the result set; all other values 28 return the empty set. Removing values as navigation options that would result in an empty result set saves the user time by preventing the user from reaching dead-ends.

Preferably, the user interface allows users to search for desired words using free-text search. In accordance with one embodiment of the present invention, illustrated in FIG. 9, a search box 30 preferably allows users to perform a free-text search for terms of interest, rather than performing a full-text search of the documents themselves. Preferably, the user interface responds to such a search by presenting a list 32 of terms 34 including organized by attribute 36, and allowing the user to select from among them. Preferably, the user interface responds to the user's selection by presenting the user with the navigation state corresponding to the selection of that term. The user may then either navigate from that state (i.e., by narrowing or broadening it) or perform additional free-text searches for terms.

Preferably, the user interface 10 presents a full or partial list 41 of the documents that correspond to the current navigation state. Preferably, if a user is interested in a particular document 42, the user may select it and obtain a record 70 containing further information about it, including the list 72 of terms 74 that are associated with that document, as shown in FIG. 10. Preferably, the user interface 10 allows the user to select any subset of those terms 74 and thereby navigate to the navigation state that corresponds to the selected term set.

Preferably, the user interface 10 also offers navigation options that directly link to an associated navigation state that is relevant to, but not necessarily a generalization or refinement of, the present navigation state. These links preferably infer the user's interests from the present navigation state and enable the user to cross-over to a related topic. For example, if the user is visiting a particular navigation state in a food domain, links may direct the user to navigation states of wines that would complement those foods in the wine domain.

Although the interface to the navigation system has been described herein as a user interface 10, the interface could provide other forms of access to the navigation system. In alternative embodiments, the interface may be an applications program interface to allow access to the navigation system for or through other applications. The interface may also enhance the functionality of an independent data-oriented application. The interface may also be used in the context of a WWW-based application or an XML-based application. The navigation system may also support multiple interface modes simultaneously. The navigation system may be made available in a variety of ways, for example via wireless communications or on handheld devices.

Knowledge Base

Preferably, the navigation system stores all information relevant to navigation in a knowledge base. The knowledge base is the repository of information from two processes: taxonomy definition and classification. Taxonomy definition is the process of identifying the relevant attributes to characterize documents, determining the acceptable values for those attributes (such as a list or range of values), and defining a partial order of refinement relationships among terms (attribute-value pairs). Classification is the process of associating terms with documents. The knowledge base may also be used to maintain any information assets that support these two processes, such as domains, classification rules and default expectations. Additionally, the knowledge base may be used to maintain supplementary information and materials that affect users' navigation experience.

The taxonomy definition process identifies a set of attributes that appropriately characterize documents. A typical way to organize the taxonomy definition process is to arrange the collections of documents into domains, which are sets of documents that conform to a natural grouping and for which a manageable number of attributes suffice to effectively distinguish and navigate among the documents in that domain. The knowledge base preferably includes a characterization of each domain, which might include rules or default expectations concerning the classification of documents in that domain.

The taxonomy definition process also identifies a full set of values, at varying levels of specificity when appropriate, for each attribute. The values preferably identify the specific properties of the documents in the collection. The values may be enumerated explicitly or defined implicitly. For example, for a "color" attribute, a full set of valid color values may be specified, but for a "price" or "date" attribute, a range within which the values may fall or a general data type, without defining a range, may be specified. The process of identifying these values may include researching the domain or analyzing the collection of documents.

The taxonomy definition process also defines a partial order of refinement relationships among terms (attribute-value pairs). For example, the term Origin: France could refine the term Origin: Europe. The refinement relationship is transitive and antisymmetric but not necessarily total. Transitivity means that, if term A refines term B and term B refines term C, then term A refines term C. For example, if Origin: Paris refines Origin: France and Origin: France refines Origin: Europe, then Origin: Paris refines Origin: Europe. Antisymmetry means that, if two terms are distinct, then both terms cannot refine each other. For example, if Origin: Paris refines Origin: France, then Origin: France does not refine Origin: Paris.

Further, the partial order of refinement relationships among terms is not necessarily a total one. For example, there could be two terms, Origin: France and Origin: Spain, such that neither term refines the other. Two terms with this property are said to be incomparable. Generally, a set of two or more terms is mutually incomparable if, for every pair of distinct terms chosen from that set, the two terms are incomparable. Typically, but not necessarily, two terms with distinct attributes will be incomparable.

Given a set of terms, a term is a maximal term in that set if it does not refine any other terms in the set, and it is a minimal term in that set if no other term in the set refines it. For example, in the set {Origin: France, Origin: Paris, Origin: Spain, Origin: Madrid}, Origin: France and Origin: Spain are maximal, while Origin: Paris and Origin: Madrid are minimal. In the knowledge base, a term is a root term if it does not refine any other terms and a term is a leaf term if no other term refines it.

FIGS. 11A, 11B, and 11C illustrate attributes 112 and values 114, arranged in accordance with the partial order relationships, that could be used for classifying wines. The attributes 112 are Type/Varietal, Origin, and Vintage. Each attribute 112 corresponds to a maximal term for that attribute. An attribute 112 can have a flat set of mutually incomparable values (e.g., Vintage), a tree of values (e.g., Origin), or a general partial order that allows a value to refine a set of two or more mutually incomparable values (e.g., Type/Varietal). The arrows 113 indicate the refinement relationships among values 114.

Attributes and values may be identified and developed in several ways, including manual or automatic processing and the analysis of documents. Moreover, this kind of analysis may be top-down or bottom-up; that is, starting from root terms and working towards leaf terms, or starting from leaf terms and working towards root terms. Retailers, or others who have an interest in using the presented invention to disseminate information, may also define attributes and terms.

The classification process locates documents in the collection of navigation states by associating each document with a set of terms. Each document is associated with a set of mutually incomparable terms, e.g., {Type/Varietal: Chianti, Origin: Italy, Vintage: 1996}, as well as any other desired descriptive information. If a document is associated with a given term, then the document is also associated with all of the terms that the given term refines.

The classification process may proceed according to a variety of workflows. Documents may be classified in series or in parallel, and the automatic and manual classification steps may be performed one or more times and in any order. To improve accuracy and throughput, human experts may be assigned as specialists to oversee the classification task for particular subsets of the documents, or even particular attributes for particular subsets of the documents. In addition, the classification and taxonomy processes may be interleaved, especially as knowledge gained from one process allows improvements in the other.

FIG. 12 illustrates the stages in a possible flow for the classification process 250. The data acquisition step 252, that is, the collection of documents for the database, may occur in several different ways. For example, a retailer with a product catalog over which the navigation system will operate might provide a set of documents describing its products as a predefined set. Alternatively, documents may be collected from one source, e.g., one Web site, or from a number of sources, e.g., multiple Web sites, and then aggregated. If the desired documents are Web pages, the documents may be collected by appropriately crawling the Web, selecting documents, and discarding documents that do not fit in the domain. In the data translation step 254, the collected documents are formatted and parsed to facilitate further processing. In the automatic classification step 256, the formatted and parsed documents are processed in order to automatically associate documents with terms. In the manual classification step 258, human reviewers may verify and amend the automatic classifications, thereby ensuring quality control. Preferably, any rules or expectations violated in either the automatic classification step 256 or the manual classification step 258 would be flagged and presented to human reviewers as part of the manual classification step 258. If the collection of documents is divided into domains, then there will typically be rules that specify a certain minimal or preferred set of attributes used to classify documents from each domain, as well as other domain-specific classification rules. When the classification process is complete, each document will have a set of terms associated with it, which locate the document in the collection of navigation states.

In FIG. 13, table 180 shows a possible representation of a collection of classified wine bottles. Preferably, each entry is associated with a document number 182, which could be a universal identifier, a name 184, and the associated terms 186. The name is preferably descriptive information that could allow the collection to be accessed via a free-text search engine as well as via the term-based navigation system.

In another aspect of the invention, the knowledge base also includes a catalog of canonical representations of documents. Each catalog entry represents a conceptually distinct item that may be associated with one or more documents. The catalog allows aggregation of profile information from multiple documents that relate to the item, possibly from multiple sources. For example, if the same wine is sold by two vendors, and if one vendor provides vintage and geographic location information and another provides taste information, that information from the two vendors can be combined in the catalog entry for that type of wine. The catalog may also improve the efficiency of the classification process by eliminating duplicative profiling. In FIG. 12, the catalog creation step 260 associates classified documents with catalog entries, creating new catalog entries when appropriate. For ease of reference, an item may be uniquely identified in the catalog by a universal identifier.

The knowledge base may also define stores, where a store is a subcollection of documents that are grouped to be searchable at one time. For example, a particular online wine merchant may not wish to display documents corresponding to products sold by that merchant's competitors, even though the knowledge base may contain such documents. In this case, the knowledge base can define a store of documents that does not include wines sold by the merchant's competitors. In FIG. 12, the store creation step 262 may define stores based on attributes, terms, or any other properties of documents. A document may be identified with more than one store. The knowledge base may also contain attributes or terms that have been customized for particular stores.

In FIG. 12, the export process step 264 exports information from the knowledge base to another stage in the system that performs further processing necessary to generate a navigable data structure.

Navigation States

The navigation system represents, explicitly or implicitly, a collection of navigation states. These navigation states are related by a partial order of refinement that is derived from the partial order that relates the terms.

Figure 14:
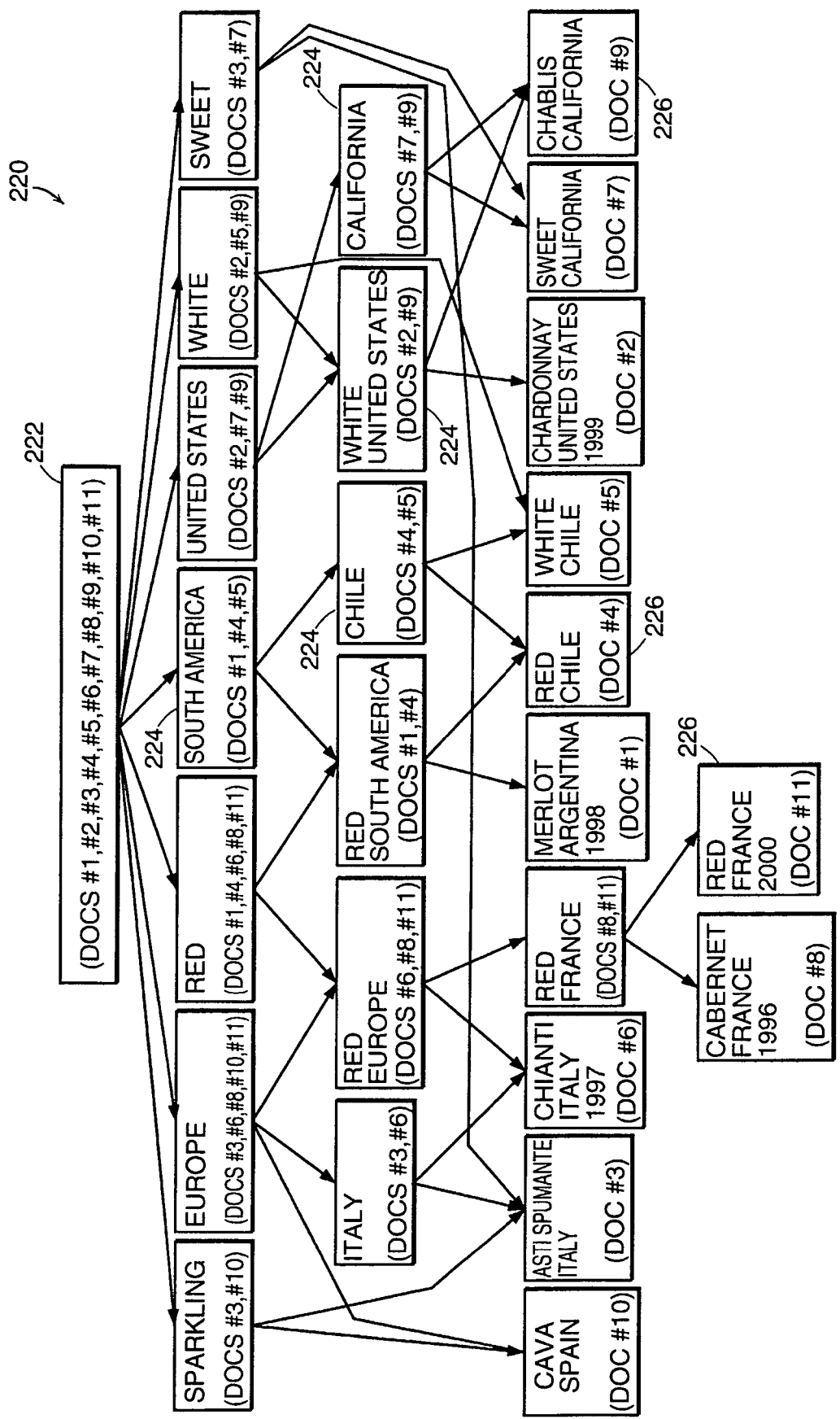
FIG. 14 is a representative partial order of navigation states in accordance with an embodiment of the present invention.

A navigation state has two representations. First, a navigation state corresponds to a subset of the collection of documents. Second, a navigation state corresponds to a set of mutually incomparable terms. FIG. 14 illustrates some navigation states for the documents and terms based on the wine example discussed above. For example, one navigation state 224 is {Origin: South America} (documents #1, #4, #5); a second navigation state 224 is {Type/Varietal: White, Origin: United States} (documents #2, #9). The subset of documents corresponding to each navigation state includes the documents that are commonly associated with all of the terms in the corresponding set of mutually incomparable terms. At the same time, the set of mutually incomparable terms corresponding to each navigation state includes all of the minimal terms from the set of terms that are common to the subset of documents, i.e., the set of terms that are commonly associated with every document in the subset. Each navigation state is preferably unique and fully specified; for a particular set of terms, or for a given set of documents, there is no more than one corresponding navigation state.

One way preferred to define the collection of navigation states is to uniquely identify each navigation state by a canonical set of mutually incomparable terms. A two-step mapping process that maps an arbitrary term set to a canonical set of mutually incomparable terms creates states that satisfy this property. In the first step of the process, an arbitrary set of terms is mapped to the subset of documents that are associated with all of those terms. Recalling that if a document is associated with a given term, then the document is also associated with all of the terms that the given term refines, in the second step of the process, this subset of documents is mapped to the set of minimal terms in the set of terms that are common to all of the documents in that document set. The term set derived from this second step is a set of mutually incomparable terms that uniquely identifies the corresponding subset of documents, and, hence, is a canonical representation for a navigation state. By way of illustration, referring to the wine example in FIG. 14, the term set {Origin: France} maps to the subset of documents {documents #8, #11}, which in turn maps to the canonical term set {Type/Varietal: Red, Origin: France}.

The navigation states 222, 224, 226 are related by a partial order of refinement relationships 220 derived from the partial order that relates terms. This partial order can be expressed in terms of either the subsets of documents or the term sets that define a navigation state. Expressed in terms of subsets of documents, a navigation state A refines a navigation state B if the set of documents that corresponds to state A is a subset of the set of documents that corresponds to state B. Expressed in terms of term sets, a navigation state A refines a navigation state B if all of the terms in state B either are in state A or are refined by terms in state A. Referring to FIG. 14, the navigation state 226 corresponding to the term set {Type/Varietal: Red, Origin: Chile} (document #4) refines the navigation state 224 corresponding to {Origin: Chile} (documents #4, #5). Since the refinement relationships among navigation states give rise to a partial order, they are transitive and anti-symmetric. In the example, {Type/Varietal: Red, Origin: Chile} (document #4) refines {Origin: Chile} (documents #4, #5) and {Origin: Chile} (documents #4, #5) refines {Origin: South America} (documents #1, #4, #5); therefore, {Type/Varietal: Red, Origin: Chile} (document #4) refines {Origin: South America} (documents #1, #4, #5). The root navigation state 222 is defined to be the navigation state corresponding to the entire collection of documents. The leaf navigation states 226 are defined to be those that cannot be further refined, and often (though not necessarily) correspond to individual documents. There can be arbitrarily many intermediate navigation states 224 between the root 222 and the leaves 226. Given a pair of navigation states A and B where B refines A, there can be multiple paths of intermediate navigation states 224 connecting A to B in the partial order. For convenience of definition in reference to the implementation described herein, a navigation state is considered to refine itself.

A user browses the collection of documents by visiting a sequence of one or more navigation states typically starting at the root navigation state 222. There are three basic modes of navigation among these states. The first mode is refinement, or moving from the current navigation state to a navigation state that refines it. The user can perform refinement either by adding a term to the current navigation state or by refining a term in the current navigation state; i.e., replacing a term with a refinement of that term. After the user adds or refines a term, the new term set can be mapped to a canonical term set according to the two-step mapping described above. The second mode is generalization, or moving from the current navigation state to a more general navigation state that the current state refines. The user can perform generalization either by removing a term from the current navigation state or by generalizing a term in the current navigation state; i.e., replacing a current term with a term that the current term refines. After the user removes or generalizes a term, the new term set can be mapped to a canonical term set. The third mode is simply creating a query in the form of a desired term set, which again can be mapped to a canonical term set to obtain a navigation state.

Implementation

The knowledge base is transferred to a navigable data structure in order to implement the present invention. The navigation states may be fully precomputed, computed dynamically at run-time, or partially precomputed. A cache may be used to avoid redundant computation of navigation states.

In preferred embodiments, the collection of navigation states may be represented as a graph—preferably, a directed acyclic multigraph with labeled edges. A graph is a combinatorial structure consisting of nodes and edges, where each edge links a pair of nodes. The two nodes linked by an edge are called its endpoints. With respect to the present invention, the nodes correspond to navigation states, and the edges represent transitions that refine from one navigation state to another. Since refinement is directional, each edge is directed from the more general node to the node that refines it. Because there is a partial order on the navigation states, there can be no directed cycles in the graph, i.e., the graph is acyclic. Preferably, the graph is a multigraph, since it allows the possibility of multiple edges connecting a given pair of nodes. Each edge is labeled with a term. Each edge has the property that starting with the term set of the more general end point, adding the edge term, and using the two-step map to put this term set into canonical form leads to a refinement which results in the navigation state that is the other endpoint. That is, each edge represents a refinement transition between nodes based on the addition of a single term.

The following definitions are useful for understanding the structure of the graph: descendant, ancestor, least common ancestor (LCA), proper ancestor, proper descendant, and greatest lower bound (GLB). These definitions apply to the refinement partial order among terms and among nodes. If A and B are terms and B refines A, then B is said to be a descendant of A and A is said to be an ancestor of B. If, furthermore, A and B are distinct terms, then B is said to be a proper descendant of A and A is said to be a proper ancestor of B. The same definitions apply if A and B are both nodes.

If C is an ancestor of A and C is also an ancestor of B, then C is said to be a common ancestor of A and B, where A, B, and C are either all terms or all nodes. The minimal elements of the set of common ancestors of A and B are called the least common ancestors (LCAs) of A and B. If no term has a pair of incomparable ancestors, then the LCA of two terms—or of two nodes—is unique. For example, the LCA of Origin: Argentina and Origin: Chile is Origin: South America in the partial order of terms 110 of FIG. 11B. In general, however, there may be a set of LCAs for a given pair of terms or nodes.

Computation of the nodes in the graphs is preferably performed bottom-up.

The leaf nodes in the graph—that is, the nodes corresponding to leaf navigation states—may be computed directly from the classified documents. Typically, but not necessarily, a leaf node will correspond to a set containing a single document. The remaining, non-leaf nodes are obtained by computing the LCA-closure of the leaf nodes—that is, all of the nodes that are the LCAs of subsets of the leaf nodes.

The edges of the graph are determined according to a refinement function, called the R function for notational convenience. The R function takes as arguments two nodes A and B, where A is a proper ancestor of B, and returns the set of maximal terms such that, if term C is in R (A, B), then refining node A with term C results in a node that is a proper descendant of A and an ancestor (not necessarily proper) of B. For example, in FIG. 14, R ({Type/Varietal: Red}, {Type/Varietal: Merlot, Origin: Argentina, Vintage: 1998})={Type/Varietal: Merlot, Origin: South America, Vintage: 1998}. If $B_1$ is an ancestor of $B_2$, then R (A, $B_1$) is a subset of R (A, $B_2$)—assuming that A is a proper ancestor of both $B_1$ and $B_2$. For example, R ({Type/Varietal: Red}, {Type/Varietal: Red, Origin: South America})={Origin: South America}.

In the graph, the edges between nodes A and B will correspond to a subset of the terms in R (A, B). Also, no two edges from a single ancestor node A use the same term for refinement. If node A has a collection of descendant nodes {$B_1$, $B_2$, ...} such that term C is in all of the R (A, $B_i$), then the only edge from node A with term C goes to LCA ($B_1$, $B_2$, ... ), which is guaranteed to be the unique maximal node among the $B_i$. In FIG. 14, for example, the edge from node {Type/Varietal: Red} with term Origin: South America goes to node {Type/Varietal: Red, Origin: South America} rather than to that node's proper descendants {Type/Varietal: Merlot, Origin: South America, Vintage: 1998} and {Type/Varietal: Red, Origin: Chile}. The LCA-closure property of the graph ensures the existence of a unique maximal node among the $B_i$. Thus, each edge maps a node-term pair uniquely to a proper descendant of that node.

The LCA-closure of the graph results in the useful property that, for a given term set S, the set of nodes whose term sets refine S has a unique maximal node. This node is called the greatest lower bound (GLB) of S.

The graph may be computed explicitly and stored in a combinatorial data structure; it may be represented implicitly in a structure that does not necessarily contain explicit representations of the nodes and edges; or it may be represented using a method that combines these strategies. Because the navigation system will typically operate on a large collection of documents, it is preferred that the graph be represented by a method that is scalable.

The graph could be obtained by computing the LCAs of every possible subset of leaf nodes. Such an approach, however, grows exponentially in the number of leaf nodes, and is inherently not scalable. An alternative strategy for obtaining the LCA closure is to repeatedly consider all pairs of nodes in the graph, check if each pair's LCA is in the graph, and add that LCA to the graph as needed. This strategy, though a significant improvement on the previous one, is still relatively not scalable.

Figure 15:
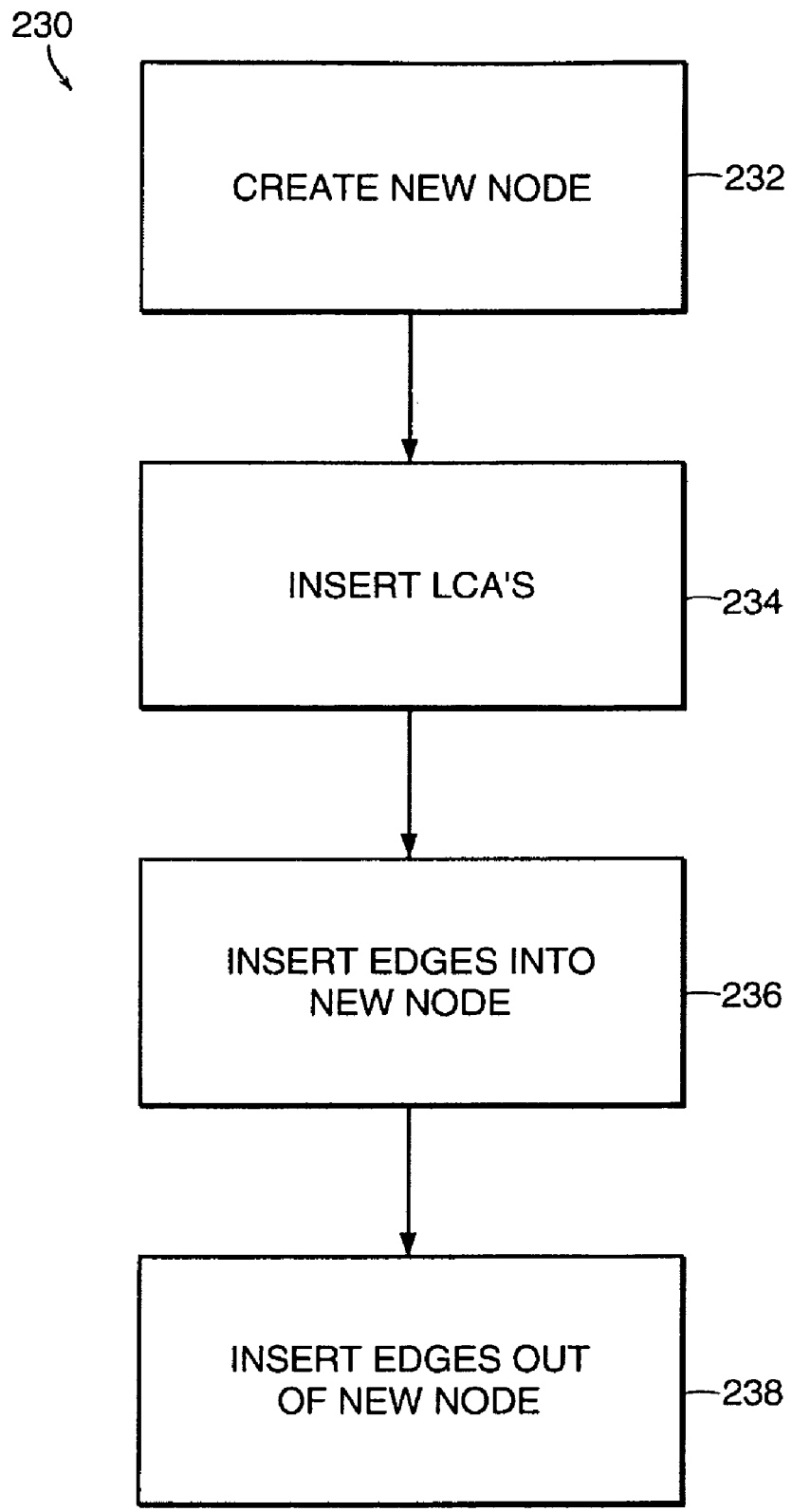
FIG. 15 is a block diagram of a process for precomputing a navigation state in accordance with an embodiment of the present invention.

A more efficient way to precompute the nodes is to process the document set sequentially, compute the node for each document, and add that node to the graph along with any other nodes necessary to maintain LCA-closure. The system stores the nodes and edges as a directed acyclic multigraph. The graph is initialized to contain a single node corresponding to the empty term set, the root node. Referring to FIG. 15, in process 230 for inserting a new node into the graph, in step 232, for each new document to be inserted into the graph that does not correspond to an existing node, the system creates a new node. In step 234, before inserting the new node into the graph, the system recursively generates and inserts any missing LCA nodes between the root node (or ancestor node) and the new node. To ensure LCA-closure after every node insertion, the system inserts the document node last, in steps 236 and 238, after inserting all the other nodes that are proper ancestors of it.

Inserting a new node requires the addition of the appropriate edges from ancestors to the node, in step 236, and to descendants out of the new node, in step 238. The edges into the node are preferably determined by identifying the ancestors that have refinement terms that lead into the new node and do not already have those refinement terms used on edges leading to intermediate ancestors of the new node. The edges out of the node are preferably determined by computing the GLB of the new node and appropriately adding edges from the new node to the GLB and to nodes to which the GLB has edges.

The entire graph may be precomputed by following the above procedures for each document in the collection. Precomputing of the graph may be preferred where the size of the graph is manageable, or if users are likely to visit every navigation state with equal probability. In practice, however, users typically visit some navigation states more frequently than others. Indeed, as the graph gets larger, some navigation states may never be visited at all. Unfortunately, reliable predictions of the frequency with which navigation states will be visited are difficult.

An alternative strategy to precomputing the navigation states is to create indexes that allow the navigation states to be computed dynamically. Specifically, each document can be indexed by all of the terms that are associated with that document or that have refinements associated with that document. The resulting index is generally much smaller in size than a data structure that stores the graph of navigation states. This dynamic approach may save space and precomputation time, but it may do so at the cost of higher response times or greater computational requirements for operation. A dynamic implementation may use a one-argument version of the R function that returns all refinement terms from a given navigation state, as well a procedure for computing the GLB of a term set.

It is also possible to precompute a subset of the navigation states. It is preferable to precompute the states that will cost the most to compute dynamically. For example, if a state corresponds to a large subset of the documents, it may be preferable to compute it in advance. In one possible partial precomputation approach, all navigation states corresponding to a subset of documents above a threshold size may be precomputed. Precomputing a state is also preferable if the state will be visited frequently. In some instances it may be possible to predict the frequency with which a navigation state will be visited. Even if the frequency with which a navigation state will be visited cannot be predicted in advance, the need to continually recompute can be reduced by caching the results of dynamic computation. Most recently or most frequently visited states may be cached.

As described above with respect to the interface, the system supports three kinds of query operations—namely refinement, generalization, and query by specifying a set of terms. These operations may be further described in terms of the graph. For query refinement, the system enumerates the terms that are on edges from the node corresponding to the current navigation state. When the user selects a term for refinement, the system responds by presenting the node to which that edge leads. Similarly, for query generalization options, the system enumerates and selects edges that lead to (rather than from) the node corresponding to the current navigation state. Alternatively, query generalization may be implemented as a special case of query by specifying a set of terms. For query by specifying a set of keywords, the system creates a virtual node corresponding to the given term set and determines the GLB of the virtual node in the graph. If no GLB is found, then there are no documents that satisfy the query. Otherwise, the GLB node will be the most general node in the graph that corresponds to a navigation state where all documents satisfy the query.

The navigation system of the present invention allows information providers to overlay a navigation system over any collection of documents. The knowledge base and navigation aspects of the invention can be performed independently by different providers, and information providers may outsource these functions to separate entities. Similarly, a generated knowledge base may be imported by a navigation specialist. Information providers may also outsource this navigation requirement to a navigation system provider. A navigation system provider could charge customers a license fee for the system independent of the amount of its usage. Alternatively, a navigation system provider could charge customers on a per-click basis, a per-purchase basis if products are available via the system, or per-transaction generated from a click through the navigation system. A navigation system provider could also function as an aggregator—compiling records from a number of sources, combining them into a global data set, and generating a navigation system to search the data set.

A navigation system in accordance with the present invention may also enhance user profiling capability and merchandising capability. The navigation system may maintain a profile of users based on the users' selections, including the particular paths selected to explore the collection of navigation states. Using the knowledge base, the system may also infer additional information regarding the users' preferences and interests by supplementing the selection information with information regarding related documents, attributes and terms in the knowledge base. That information may be used to market goods and services related to the documents of interest to the user.

The foregoing description has been directed to specific embodiments of the invention. The invention may be embodied in other specific forms without departing from the spirit and scope of the invention. The embodiments, figures, terms and examples used herein are intended by way of reference and illustration only and not by way of limitation. The scope of the invention is indicated by the appended claims and all changes that come within the meaning and scope of equivalency of the claims are intended to be embraced therein.

We claim:

1. A computer-implemented method for retrieving information comprising:
   storing, by a computer system, in a data structure a plurality of attribute-value pairs associated with a collection of materials, wherein each of a plurality of values has an association with at least one of a plurality of attributes characterizing the materials;
   providing a user interface for entering a query to retrieve information regarding the collection of materials;
   displaying through the provided user interface a first set of navigation options corresponding to the stored plurality of attribute-value pairs associated with a plurality of attributes;
   in response to a query received at the user interface that includes a selection of at least a first attribute-value pair from the displayed first set of navigation options:
   displaying, by the computer system, through the user interface a representation of a first navigation state responsive to the query, the displayed of the representation of the first navigation state corresponding to a first set of attribute-value pairs and to a first particular subset of the materials, the first set of attribute-value pairs including at least the first selected attribute-value pair, the first particular subset of the materials consisting of materials in the collection of materials, each of the first particular subset of the materials is described by every attribute-value pair in the first set of attribute-value pairs; and
   displaying, by the computer system, through the user interface a second set of context-dependent navigation options for selecting a term corresponding to an attribute-value pair to navigate from the first navigation state to another navigation state, the displayed second set of context-dependent navigation options including an option to select a term corresponding to a second attribute that was not represented in the displayed first set of navigation options; and
   in response to a selection of a term corresponding to a second attribute-value pair associated with the second attribute, the selection indicates a navigation option from the displayed second set of context-dependent navigation options:
   displaying, by the computer system, through the user interface a representation of a second navigation state responsive to the selection of the second attribute-value pair, the displayed representation of the second navigation state corresponding to a second set of attribute-value pairs and to a second particular subset of the materials, the second particular subset of the materials consisting of those materials in the collection of materials, each of the second particular subset of the materials is described by every attribute-value pair in the second set of attribute-value pairs; and
   displaying, by the computer system, through the user interface a third set of navigation options for navigating from the displayed representation of the second navigation state to another navigation state, the displayed third set of navigation options including an option to de-select a term corresponding to an attribute-value pair other than the selected second attribute-value pair.

2. A computer program product, residing on a computer-readable medium, for use in retrieving information, the computer program product comprising instructions executed by a computer to:
   access a data structure containing a plurality of attribute-value pairs associated with a collection of materials, wherein each of a plurality of values has an association with at least one of a plurality of attributes characterizing the materials;
   provide a user interface for entering a query to retrieve information regarding the collection of materials;
   display through the provided user interface a first set of navigation options corresponding to the accessed plurality of attribute-value pairs associated with a plurality of attributes;
   in response to a query received at the user interface that includes a selection of at least a first attribute-value pair from the displayed first set of navigation options:
   display through the user interface a representation of a first navigation state responsive to the query, the displayed of the representation of the first navigation state corresponding to a first set of attribute-value pairs and to a first particular subset of the materials, the first set of attribute-value pairs including at least the first selected attribute-value pair, the first particular subset of the materials consisting of materials in the collection of materials, each of the first particular subset of the materials is described by every attribute-value pair in the first set of attribute-value pairs; and display through the user interface a second set of context-dependent navigation options for selecting a term corresponding to an attribute-value pair to navigate from the first navigation state to another navigation state, the displayed second set of context-dependent navigation options including an option to select a term corresponding to a second attribute that was not represented in the displayed first set of navigation options; and in response to a selection of a term corresponding to a second attribute-value pair associated with the second attribute, the selection indicates a navigation option from the displayed second set of context-dependent navigation options:

display through the user interface a representation of a second navigation state responsive to the selection of the second attribute-value pair, the displayed representation of the second navigation state corresponding to a second set of attribute-value pairs and to a second particular subset of the materials, the second particular subset of the materials consisting of materials in the collection of materials, each of the first particular subset of the materials is described by every attribute-value pair in the second set of attribute-value pairs; and display through the user interface a third set of navigation options for navigating from the displayed representation of the second navigation state to another navigation state, the displayed third set of navigation options including an option to de-select a term corresponding to an attribute-value pair other than the selected second attribute-value pair.

3. A system for retrieving information comprising:

a memory containing a plurality of attribute-value pairs associated with a collection of materials, wherein each of a plurality of values has an association with at least one of a plurality of attributes characterizing the materials;

a user interface for entering a query to retrieve information regarding the collection of materials and for displaying a first set of navigation options corresponding to the contained plurality of attribute-value pairs associated with a plurality of attributes; and a processor programmed to:

in response to a query received from the user interface that includes a selection of at least a first attribute-value pair from the displayed first set of navigation options:

display through the user interface a representation of a first navigation state responsive to the query, the displayed of the representation of the first navigation state corresponding to a first set of attribute-value pairs and to a first particular subset of the materials, the first set of attribute-value pairs including at least the first selected attribute-value pair, the first particular subset of the materials consisting of materials in the collection of materials, each of the first particular subset of the materials is described by every attribute-value pair in the first set of attribute-value pairs; and display through the user interface a second set of context-dependent navigation options for selecting a term corresponding to an attribute-value pair to navigate from the first navigation state to another navigation state, the displayed second set of context-dependent navigation options including an option to select a term corresponding to a second attribute that was not represented in the displayed first set of navigation options; and in response to a selection of a term corresponding to a second attribute-value pair associated with the second attribute, the selection indicates a navigation option from the displayed second set of context-dependent navigation options:

display through the user interface a representation of a second navigation state responsive to the selection of the second attribute-value pair, the displayed representation of the second navigation state corresponding to a second set of attribute-value pairs and to a second particular subset of the materials, the second particular subset of the materials consisting of materials in the collection of materials, each of the second particular subset of the materials is described by every attribute-value pair in the second set of attribute-value pairs; and display through the user interface a third set of navigation options for navigating from the displayed representation of the second navigation state to another navigation state, the displayed third set of navigation options including an option to de-select a term corresponding to an attribute-value pair other than the selected second attribute-value pair.

\* \* \* \* \*